(12) United States Patent
Fukunishi et al.

(10) Patent No.: US 10,723,866 B2
(45) Date of Patent: Jul. 28, 2020

(54) RUBBER COMPOSITION AND PNEUMATIC TIRE

(71) Applicant: TOYO TIRE & RUBBER CO., LTD., Itami-shi, Hyogo (JP)

(72) Inventors: Satoshi Fukunishi, Osaka (JP); Takashi Yuri, Osaka (JP); Kohei Matsuura, Osaka (JP); Sho Taniguchi, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 176 days.

(21) Appl. No.: 15/779,941

(22) PCT Filed: Dec. 14, 2016

(86) PCT No.: PCT/JP2016/005132
§ 371 (c)(1),
(2) Date: May 30, 2018

(87) PCT Pub. No.: WO2017/104135
PCT Pub. Date: Jun. 22, 2017

(65) Prior Publication Data
US 2018/0346694 A1    Dec. 6, 2018

(30) Foreign Application Priority Data

Dec. 15, 2015  (JP) ................. 2015-244425
Dec. 15, 2015  (JP) ................. 2015-244427
Sep. 5, 2016   (JP) ................. 2016-172854
Nov. 22, 2016  (JP) ................. 2016-227186
Dec. 13, 2016  (JP) ................. 2016-241504
Dec. 13, 2016  (JP) ................. 2016-241505
Dec. 13, 2016  (JP) ................. 2016-241507
Dec. 13, 2016  (JP) ................. 2016-241509

(51) Int. Cl.
*C08L 9/06* (2006.01)
*C08L 7/00* (2006.01)
(Continued)

(52) U.S. Cl.
CPC .............. *C08L 9/06* (2013.01); *B60C 1/00* (2013.01); *C08K 3/04* (2013.01); *C08K 3/36* (2013.01); *C08K 7/16* (2013.01); *C08L 7/00* (2013.01); *C08L 9/00* (2013.01); *C08L 13/00* (2013.01); *C08L 33/06* (2013.01); *C08L 33/10* (2013.01); *C08L 101/00* (2013.01); *C08K 2201/003* (2013.01); *C08K 2201/005* (2013.01); *C08K 2201/006* (2013.01)

(58) Field of Classification Search
CPC .......... C08L 33/06; C08L 33/08; C08L 33/10; C08K 2201/003; C08K 2201/005
See application file for complete search history.

(56) References Cited

U.S. PATENT DOCUMENTS 4,866,131 A    9/1989   Fujimaki et al.
5,912,303 A    6/1999   Nakahama et al.
(Continued)

FOREIGN PATENT DOCUMENTS

JP    61-203145 A    9/1986
JP    5-125225 A     5/1993
(Continued)

OTHER PUBLICATIONS

Machine translation of JPH08225706. (Year: 1996).*
(Continued)

*Primary Examiner* — Wenwen Cai
(74) *Attorney, Agent, or Firm* — Westerman, Hattori, Daniels & Adrian, LLP

(57) ABSTRACT

A rubber composition according to an embodiment includes: a rubber component comprising diene rubber; and fine particles which are formed of a specific polymer and have a glass transition point of −70° C. to 0° C. The fine particles are fine particles formed of a (meth)acrylate polymer having a constitutional unit represented by formula (1) or formed of a polymer having a constitutional unit represented by formula (4). In formula (1), $R^1$ represents a hydrogen atom or a methyl group, and $R^2$ represents an alkyl group having 4 to 18 carbon atoms. In formula (4), at least one of $R^{11}$, $R^{12}$, $R^{13}$, $R^{14}$, $R^{15}$, and $R^{16}$ represents an aliphatic hydrocarbon group having 3 to 8 carbon atoms, and the remainder represents a hydrogen atom or an aliphatic hydrocarbon group having 1 or 2 carbon atoms.

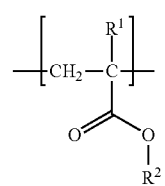

(1)

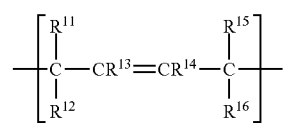

(4)

16 Claims, No Drawings

(51) Int. Cl.
*C08L 33/10* (2006.01)
*C08L 101/00* (2006.01)
*B60C 1/00* (2006.01)
*C08K 7/16* (2006.01)
*C08L 9/00* (2006.01)
*C08L 33/06* (2006.01)
*C08L 13/00* (2006.01)
*C08K 3/04* (2006.01)
*C08K 3/36* (2006.01)

(56) References Cited

U.S. PATENT DOCUMENTS

| | | |
|---|---|---|
| 6,127,488 A | 10/2000 | Obrecht et al. |
| 2005/0239954 A1 | 10/2005 | Licht et al. |
| 2010/0022714 A1 | 1/2010 | Varagniat et al. |
| 2011/0077349 A1 | 3/2011 | Hoshino |
| 2012/0048446 A1 | 3/2012 | Kaszas et al. |
| 2013/0324657 A1 | 12/2013 | Okada et al. |
| 2014/0100316 A1 | 4/2014 | Washizu |
| 2015/0126698 A1 | 5/2015 | Kojima et al. |
| 2015/0376343 A1 | 12/2015 | Kaszas et al. |
| 2017/0009066 A1 | 1/2017 | Fukunishi et al. |

FOREIGN PATENT DOCUMENTS

| | | |
|---|---|---|
| JP | 7-268169 A | 10/1995 |
| JP | 8-225706 A | 9/1996 |
| JP | 8-311263 A | 11/1996 |
| JP | 9-328577 A | 12/1997 |
| JP | 10-204217 A | 8/1998 |
| JP | 2002-212344 A | 7/2002 |
| JP | 2005-139309 A | 6/2005 |
| JP | 2005-537382 A | 12/2005 |
| JP | 2009-542827 A | 12/2009 |
| JP | 2012-52114 A | 3/2012 |
| JP | 2012-158710 A | 8/2012 |
| JP | 2014-24915 A | 2/2014 |
| JP | 2014-88544 A | 5/2014 |
| WO | 2009/148029 A1 | 12/2009 |
| WO | 2012/111640 A1 | 8/2012 |
| WO | 2015/155965 A1 | 10/2015 |

OTHER PUBLICATIONS

International Search Report dated Mar. 21, 2017, issued in counterpart International Application No. PCT/JP2016/005132 (5 pages).

* cited by examiner

RUBBER COMPOSITION AND PNEUMATIC TIRE

TECHNICAL FIELD

The present invention relates to a rubber coat position and a pneumatic tire obtained by using the same.

BACKGROUND ART

In the related art, for example, a rubber composition used for a tire is required to balance grip performance (wet grip performance) on a wet road surface and rolling resistance performance that contributes to low fuel consumption at a high level. However, since these are conflicting characteristics, it is not easy to improve these two characteristics at the same time.

PTL 1 suggests that a copolymer resin of a C5 fraction due to thermal decomposition of naphtha and styrene or vinyl toluene compounded in order to improve the wet grip performance without degrading the rolling resistance performance. In this case, the wet grip performance can be improved, but there is a problem of a decrease in operation stability due to degradation of the hardness of a rubber composition at normal temperature. Further, since the modulus of elasticity of the rubber composition at a low temperature is increased so that the grip performance is degraded, low temperature performance becomes problematic.

PTL 2 discloses blending of a low-molecular-weight vinyl aromatic diene copolymer (styrene-butadiene liquid polymer) which has a molecular weight of 2000 to 50000 as a rubber component for the propose of providing a rubber composition having excellent road surface gripping force, fracture strength, abrasion resistance, and heat resistance. In this case, degradation in hardness of a rubber composition to be obtained is significant, and the operation stability when the rubber composition is applied to a tire is decreased.

PTL 3 discloses blending of a (meth)acrylate polymer which has a weight average molecular weight of 5000 to 1000000 and a glass transition point of $-70°$ C. to $0°$ C. for the purpose of suppressing degradation of low temperature performance and rolling resistance performance and improving wet grip performance. However, blending of a particulate (meth)acrylate polymer having a specific particle diameter is not disclosed.

In addition, a technique of blending rubber gel which is a cross-linked rubber particle with a rubber composition comprising diene rubber has been known. For example, PTL 4 discloses that modified diene rubber, cross-linked rubber particles, and silica are kneaded in order to obtain a rubber elastic body having lower rolling resistance and excellent rebound resilience. In PTL 4, while dispersibility of silica is increased by modified diene rubber, silica is partially unevenly distributed by excluding silica using cross-linked rubber particles. Further, PTL 5 discloses that both of wet grip performance and rolling resistance performance are achieved by blending styrene-butadiene rubber gel. However, the wet grip performance is not highly improved while suppressing degradation of hardness at normal temperature and an increase in modulus of elasticity at a low temperature.

PTL 6 discloses blending of (meth)acrylic acid alkyl ester polymer particles with a rubber composition. However, in PTL 6, the particles contribute to improvement of on-ice friction resistance by forming micro irregularities on a tread surface of a studless tire. Therefore, it is necessary to use particles having a particle diameter of 0.1 µm to 100 µm and preferably 1 µm to 30 µm, which is relatively large. It is not disclosed that the wet grip performance can be improved while suppressing degradation of hardness at normal temperature and an increase in modulus of elasticity at a low temperature by blending a particulate (meth)acrylate polymer having a smaller particle diameter.

PTL 7 discloses blending of nano particles of a non-aromatic vinyl polymer (for example, a polymer of (meth)acrylate) containing a reactive silyl group represented by formula $\equiv$Si—X (in the formula, X represents a hydroxyl group or a hydrolyzable group) with a rubber composition. However, in PTL 7, it is essential that the nano particles contain a reactive silyl group because the nano particles are used as a reinforcing filler and exhibit reinforcing properties by being combined with a coupling agent. It is not disclosed that the wet grip performance can be improved while suppressing degradation of hardness at normal temperature and an increase in modulus of elasticity at a low temperature by using fine particles formed of a (meth)acrylate polymer that does not contain a reactive silyl group.

Meanwhile, PTL 8 discloses that a branched conjugated diene copolymer obtained by introducing a branched conjugated diene component such as myrcene into a molecular chain of styrene-butadiene rubber is used as a rubber component of a rubber composition for a tire. However, in PTL 8, the branched conjugated diene compound is introduced as a constitutional unit of a copolymer for the purpose of improving the characteristics of styrene-butadiene rubber having a large amount of styrene. It is not easy to suppress degradation of low temperature characteristics because the copolymer is used as a rubber component.

CITATION LIST

Patent Literature

[PTL 1] JP-A-H09-328577
[PTL 2] JP-A-561-203145
[PTL 3] WO2015/155965A1
[PTL 4] WO2012/111640A1
[PTL 5] JP-A-1110-204217
[PTL 6] JP-A-2012-158710
[PTL 7] JP-A-2009-542827
[PTL 8] JP-A-2014-088544

SUMMARY OF INVENTION

Technical Problem

An object of an embodiment of the present invention is to provide a rubber composition which can improve wet grip performance when used for a tire while suppressing degradation of hardness at normal temperature and an increase in modulus of elasticity at a low temperature.

Solution to Problem

The rubber composition according to the embodiment of the present invention is obtained by blending fine particles which are formed of a specific polymer and have a glass transition point of $-70°$ C. to $0°$ C. with a rubber component comprising diene rubber, and the present invention includes the following embodiments.

A rubber composition according to a first embodiment includes: 1 to 100 parts by mass of fine particles which are formed of a (meth)acrylate polymer having a constitutional unit represented by the following general formula (1) and being free from a reactive silyl group and have a glass transition point of −70° C. to 0° C. and an average particle diameter of 10 nm or greater and less than 100 nm, per 100 parts by mass of a rubber component comprising diene rubber.

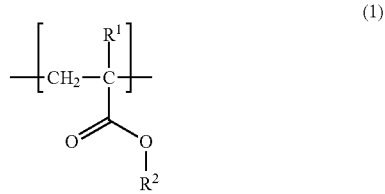

(1)

In the formula, $R^1$ is a hydrogen atom or a methyl group, $R^1$ present in the same molecule may be the same or different, $R^2$ is an alkyl group having 4 to 18 carbon atoms, and $R^2$ present in the same molecule may be the same or different.

A rubber composition according to a second embodiment includes: 1 to 100 parts by mass of fine particles which are formed of a polymer having, a constitutional unit represented by the following general formula (4) and have a glass transition point of −70° C. to 0° C. and an average particle diameter of 10 to 1000 nm, per 100 parts by mass of a rubber component comprising diene rubber.

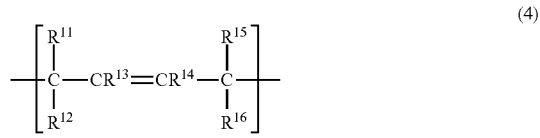

(4)

In the formula (4), $R^{11}$, $R^{12}$, $R^{13}$, $R^{14}$, $R^{15}$, and $R^{16}$ may be the same as or different from each other, at least one thereof represents an aliphatic hydrocarbon group having 3 to 8 carbon atoms, and the remainder represents a hydrogen atom or an aliphatic hydrocarbon group having 1 or 2 carbon atoms.

A rubber composition according to a third embodiment includes: 1 to 100 parts by mass of fine particles which are formed of a polymer having a constitutional unit derived from a compound represented by the following general formula (7) and have a glass transition point of −70° C. to 0° C. and an average particle diameter of 10 to 1000 nm, per 100 parts by mass of a rubber component comprising diene rubber.

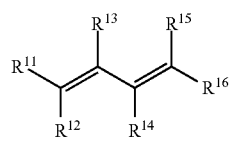

(7)

In the formula (7), $R^{11}$, $R^{12}$, $R^{13}$, $R^{14}$, $R^{15}$, and $R^{16}$ may be the same as or different from each other, at least one thereof represents an aliphatic hydrocarbon group having 3 to 8 carbon atoms, and the remainder represents a hydrogen atom or an aliphatic hydrocarbon group having 1 or 2 carbon atoms.

A pneumatic tire according to an embodiment includes the rubber composition.

Advantageous Effects of Invention

According to the embodiments, it is possible to improve wet grip performance while suppressing degradation of hardness at normal temperature and an increase in modulus of elasticity at a low temperature when the rubber composition of the present embodiments is used for a tire, by blending fine particles formed of the specific polymer with diene rubber.

DESCRIPTION OF EMBODIMENTS

[First Embodiment]

A rubber composition according to a first embodiment is obtained by blending fine particles formed of a specific (meth)acrylate polymer with a rubber component comprising diene rubber.

(a) Rubber Component

Examples of the diene rubber as the rubber component include natural rubber (NR), synthetic isoprene rubber (IR), butadiene rubber (BR), styrene-butadiene rubber (SBR), nitrile rubber (NBR), chloroprene rubber (CR), butyl rubber (IIR), styrene-isoprene copolymer rubber, butadiene-isoprene copolymer rubber, and styrene-isoprene-butadiene copolymer rubber. These may be used alone or in combination of two or more kinds thereof. Among these, at least one selected from the group consisting of NR, BR, and SBR is preferable.

The specific examples of each diene rubber exemplified above also include modified diene rubber which is modified using at least one functional group by introducing the at least one functional group selected from the group consisting of a hydroxyl group, an amino group, a carboxyl group, an alkoxyl group, an alkoxysilyl group, and an epoxy group into the molecular terminal or the molecular chain thereof. As the modified diene rubber, modified SBR and/or modified BR is preferable.

According to an embodiment, the rubber component may contain styrene-butadiene rubber having at least one functional group selected from the group consisting of an amino group, a hydroxyl group, an epoxy group, a silyl group, and a carboxyl group, that is, modified styrene-butadiene rubber (modified SBR). It is considered that an interaction (the concept including intermolecular force or affinity of a hydrogen bond or the like) between a silanol group on the surface of a silica particle and an ester group of the fine particle is obtained by using such modified SBR having a functional group. Therefore, silica and the above-described fine particles are considered to be highly dispersed in diene rubber forming a matrix phase and low hid consumption, wet grip performance, and tear resistance when the rubber composition is used for a tire can be improved in a balanced manner.

Regarding these functional groups, the amino group may be not only a primary amino group ($-NH_2$) but also a secondary amino group or a tertiary amino group. Further, in a case of a secondary or tertiary amino group, the total number of carbon atoms in a hydrocarbon group serving as a substituent is preferably 15 or less and more preferably 10 or less. The silyl group may be not only a silyl group represented by $-SiH_3$ in a narrow sense but also a substituted silyl group formed by at least one hydrogen atom bonded to a silicon atom being substituted with a substituent such as a hydroxyl group, an alkyl group, an alkoxyl group, an alkylene group, or an ether group. Examples of the silyl group include —SiL¹L²L³ (here, L¹, L², and L³ each independently represent a hydrogen atom, a hydroxyl group, an alkyl group, an alkoxyl group, —(L⁴—O)$_p$—L⁵, or —O—(L⁶—O)$_q$—L⁷; an alkyl group having 1 to 5 carbon atoms is preferable as the alkyl group, and an alkoxyl group having 1 to 4 carbon atoms is preferable as the alkoxyl group; and, in an alkyl polyether group represented by —(L⁴—O)$_p$—L⁵ or —O—(L⁶—O)$_q$—L⁷, it is preferable that L⁴ represents an alkylene group having 1 to 4 carbon atoms, L⁵ represents an alkyl group having 1 to 16 carbon atoms, p represents 1 to 20, L⁶ represents an alkylene group having 1 to 4 carbon atoms, L⁷ represents an alkyl group having 1 to 16 carbon atoms, and q represents 1 to 20). As the silyl group, an alkylsilyl group or an alkoxysilyl group is preferable and an alkoxysilyl group is more preferable. Examples of the alkoxysilyl group include a trialkoxysilyl group, an alkyldialkoxysilyl group, and a dialkylalkoxysilyl group. Among these, a trialkoxysilyl group such as a triethoxysilyl group or a trimethoxysilyl group is preferable.

As the functional group of modified SBR, at least one selected from the group consisting of an amino group, a hydroxyl group, and a silyl group is preferable; and at least one selected from the group consisting of an amino group, a hydroxyl group, and an alkoxysilyl group is more preferable.

The functional group may be introduced into at least one terminal of styrene-butadiene rubber or introduced into a molecular chain. In other words, the modified SBR may be terminal-modified SBR formed by the functional group being introduced into at least one terminal of a molecular chain of SBR, main chain-modified SBR formed by the functional group being introduced into the main chain of SBR, or main chain terminal-modified SBR formed by the functional group being introduced into the main chain and a terminal. The modified SBR containing such a functional group is known and the production method or the like is not limited. For example, the functional group may be introduced by modifying styrene-butadiene rubber synthesized through anionic polymerization using a modifier.

According to an embodiment, the rubber component may be formed of only modified diene rubber or a combination of modified diene rubber and unmodified diene rubber. The rubber component may be formed of only modified SBR or a combination of modified SBR and another diene-based rubber. In this case, the modified SBR may be used alone or in combination of two or more kinds thereof.

More specifically, 100 parts by mass of the rubber component may contain 30 parts by mass or greater or 50 parts by mass or greater of modified SBR. According to an embodiment, 100 parts by mass of the rubber component may comprise 50 to 90 parts by mass of modified SBR and 10 to 50 parts by mass of unmodified diene rubber (for example, BR and/or NR) or comprise 60 to 90 parts by mass of modified SBR and 40 to 10 parts by mass of unmodified diene rubber.

(b) Fine Particles

Fine particles which are formed of a (meth)acrylate polymer having an alkyl (meth)acrylate unit represented by the following general formula (1) as a constitutional unit (also referred to as a repeating unit) are used as the fine particles.

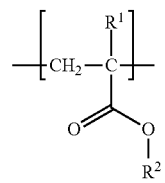

In the formula (1), R¹ represents a hydrogen atom or a methyl group and R¹ present in the same molecule may be the same or different. R² represents an alkyl group having 4 to 18 carbon atoms, and R² present in the same molecule may be the same different. The alkyl group as R² may be linear or branched. R² represents preferably an alkyl group having 6 to 16 carbon atoms and more preferably an alkyl group having 8 to 15 carbon atoms.

The (meth)acrylate polymer is formed by polymerizing a monomer containing one or two or more alkyl (meth)acrylates. Here, (meth)acrylate indicates one or both of acrylate and methacrylate. Further, (meth)acrylic acid indicates one or both of acrylic acid and methacrylic acid.

Examples of the alkyl (meth)acrylate include n-alkyl (meth)acrylate such as n-pentyl acrylate, n-pentyl acrylate, n-hexyl acrylate, n-heptyl acrylate, n-octyl acrylate, n-nonyl acrylate n-decyl acrylate, n-undecyl acrylate, n-dodecyl acrylate, n-tridecyl acrylate, n-butyl methacrylate n-pentyl methacrylate n-hexyl methacrylate, n-heptyl, methacrylate, n-octyl methacrylate, n-nonyl methacrylate, n-decyl methacrylate, n-undecyl methacrylate, and n-dodecyl methacrylate; isoalkyl (meth)acrylate such as isobutyl acrylate, isopentyl acrylate, isohexyl acrylate, isoheptyl acrylate, isooctyl acrylate, isononyl acrylate, isodecyl acrylate, isoundecyl acrylate, isodadecyl acrylate, isotridecyl acrylate, isotetradecyl acrylate, isobutyl methacrylate, isopentyl methacrylate, isohexyl methacrylate, isoheptyl methacrylate, isooctyl methacrylate, isononyl methacrylate isodecyl methacrylate, isoundecyl methacrylate, isododecyl methacrylate, isotridecyl methacrylate and isotetradecyl methacrylate; 2-methylbutyl acrylate, 2-ethylpentyl acrylate, 2-methylhexyl acrylate, 2-ethylhexyl acrylate, 2-ethylheptyl acrylate, 2-methylpentyl methacrylate, 2-methylhexyl methacrylate, 2-ethylhexyl methacrylate, and 2-ethylheptyl methylate. These may be used alone or in combination of two or more kinds thereof.

Here, isoalkyl indicates an alkyl group having a methyl side chain in the second carbon atom from the alkyl chain end. For example, isodecyl indicates an alkyl group having 10 carbon atoms which has a methyl side chain in the second carbon atom from the chain end and the concept thereof includes not only an 8-methylnonyl group but also a 2,4,6-trimethylheptyl group.

According to an embodiment, it is preferable that the (meth)acrylate polymer is a polymer having a constitutional unit represented by the following general formula (2) as the constitutional unit represented by the formula (1).

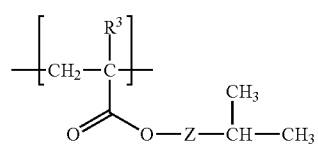

In the formula (2), $R^3$ represents a hydrogen atom or a methyl group (preferably a methyl group), and $R^3$ present in the same molecule may be the same or different. Z represents an alkylene group (that is, an alkanediyl group) having 1 to 15 carbon atoms, and Z present in the same molecule may be the same or different. Z may be linear or branched.

The constitutional unit represented by the formula (2) corresponds to a case where $R^2$ in the formula (1) is represented by the following general formula (2A).

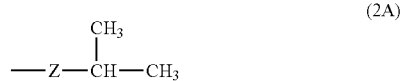

(2A)

Z in the formula (2A) has the same definition as that for Z in the formula (2).

Examples of (meth)acrylate forming such a constitutional unit include the above-described isoalkyl (meth)acrylate. The effects of the present embodiment can be increased by using such (meth)acrylate (more preferably methacrylate) having an isoalkyl group. Z in the formulae (2) and (2A) represents preferably an alkylene group having 5 to 12 carbon atoms, more preferably an alkylene group having 6 to 10 carbon atoms, and particularly preferably an alkylene group having 7 carbon atoms. As an example, it is preferable that the (meth)acrylate polymer is a polymer of a monomer containing isodecyl methacrylate.

According to another embodiment, the (meth)acrylate polymer may be a polymer having a constitutional unit represented by the following general formula (3) or a polymer having a constitutional unit represented by the formula (2) and a constitutional unit represented by the formula (3), as the constitutional unit represented by the formula (1). In the latter case, the addition form of both constitutional units may be random addition or block addition, and random addition is preferable.

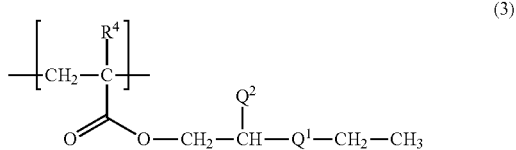

(3)

In the formula (3), $R^4$ represents a hydrogen atom or a methyl group (preferably a methyl group), and $R^4$ present in the same molecule may be the same or different. $Q^1$ represents an alkylene group (that is, an alkanediyl group) having 1 to 6 carbon atoms (more preferably 1 to 3 carbon atoms) and may be linear or branched (preferably linear), and $Q^1$ present in the same molecule may be the same or different. $Q^2$ represents a methyl group or an ethyl group (preferably an ethyl group), $Q^2$ present in the same molecule may be the same or different.

The constitutional unit represented by the formula (3) corresponds to a case where $R^2$ in the formula (1) is represented by the following general formula (3A).

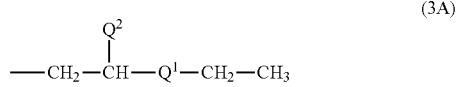

(3A)

In the formula (3A), $Q^1$ and $Q^2$ have the same definitions as those for $Q^1$ and $Q^2$ in the formula (3).

In a case where the (meth)acrylate polymer is a copolymer having a constitutional unit represented by the formula (2) and a constitutional unit represented by the formula (3), the effect of improving the balance between wet grip performance and rolling resistance performance while suppressing degradation of hardness at normal temperature and an increase in modulus of elasticity at a low temperature can be increased.

Here, specific examples of (meth)acrylate forming a constitutional unit represented by the formula (3) include those from which n-alkyl (meth)acrylate and isoalkyl (meth)acrylate are excluded from among the examples of alkyl (meth)acrylate exemplified above. Among these, 2-ethylhexyl methacrylate is particularly preferable.

In a case of such a copolymer, the ratio (copolymer ratio) between the constitutional unit represented by the formula (2) and the constitutional unit represented by the formula (3) is not particularly limited. For example, the molar ratio of the constitutional unit represented by the formula (2) to the constitutional unit represented by the formula (3) may be in a range of 30/70 to 90/10 or in a range of 40/60 to 85/15.

The (meth)acrylate polymer constituting the fine particles according to the present embodiment may be a polymer formed of only the alkyl (meth)acrylate. However, according to a more preferred embodiment, the (meth)acrylate polymer is a polymer having a cross-linked structure formed by cross-linking alkyl (meth)acrylate in the presence of a polyfunctional vinyl monomer. In other words, according to a preferred embodiment, the (meth)acrylate polymer has a constitutional unit represented by the formula (1) and a constitutional unit derived from a polyfunctional vinyl monomer and has a cross-linked structure using the constitutional unit derived from the polyfunctional vinyl monomer as a cross-linking point.

As the polyfunctional vinyl monomer, a compound having at least two vinyl groups which can be polymerized by free radical polymerization is exemplified, and examples of the compound include di(meth)acrylate or tri(meth)acrylate of a diol or a triol (here, examples of the diol or triol include ethylene glycol, propylene glycol, 1,4-butanediol, 1,6-hexanediol, and trimethylolpropane); alkylene di(meth)acrylamide such as methylene bis-acrylamide; and a vinyl aromatic compound having at least two vinyl groups such as diisopropenylbenzene, divinylbenzene, or trivinylbenzene, and these may be used alone or in combination of two or more kinds thereof.

The (meth)acrylate polymer is basically formed of a constitutional unit represented by the formula (1), that is, has a constitutional unit represented by the formula (1) as a main component, but may be used in combination with another vinyl compound within the range not impairing the effects of the present embodiment. Although not particularly limited, the molar ratio of the constitutional unit represented by the formula (1) to all constitutional units (all repeating units) constituting the (meth)acrylate polymer is preferably 50% by mole or greater, more preferably 80% by mole or greater, and still more preferably 90% by mole or greater. The upper limit of the molar ratio of the constitutional unit represented by the formula (1) is not particularly limited, but may be 99.5% by mole or less or 99% by mole or less in a case where the above-described polyfunctional vinyl monomer is added. The molar ratio of the constitutional unit based on the polyfunctional vinyl monomer may be in a range of 0.5% to 20% by mole, in a range of 1% to 10% by mole, or in a range of 1% to 5% by mole.

According to an embodiment, in a case where the (meth) acrylate polymer is a polymer having a constitutional unit represented by the formula (2), the molar ratio of the constitutional unit represented by the formula (2) to all constitutional units of the polymer is preferably 25% by mole or greater, more preferably 35% by mole or greater and may be 50% by mole or greater or 80% by mole or greater. The upper limit of the molar ratio is not particularly limited, but may be 99.5% by mole or less or 99% by mole or less in a case where the polyfunctional vinyl monomer is added in the above-described molar ratio.

According to an embodiment, in a case where the (meth) acrylate polymer is a polymer having a constitutional unit represented by the formula (3), the molar ratio of the constitutional unit represented by the formula (3) to all constitutional units of the polymer is preferably 25% by mole or greater, more preferably 35% by mole or greater and may be 50% by mole of greater or 80% by mole or greater. The upper limit of the molar ratio is not particularly limited, but may be 99.5% by mole or less or 99% by mole or less in a case where the polyfunctional vinyl monomer is added in the above-described molar ratio.

Further, according to another embodiment, in a case where the (meth)acrylate polymer is a copolymer of the constitutional unit represented by the formula (2) and the constitutional unit represented by the formula (3), the molar ratio of the constitutional unit represented by the formula (2) to all constitutional units of the copolymer may be in a range of 25% to 90% by mole and the molar ratio of the constitutional unit represented by the formula (3) to all constitutional units of the copolymer may be in a range of 5% to 60% by mole; and the molar ratio of the constitutional unit represented by the formula (2) to all constitutional units of the copolymer may be in a range of 35% to 85% by mole and the molar ratio of the constitutional unit represented by the formula (3) to all constitutional units of the copolymer may be in a range of 8% to 55% by mole. In addition, the total molar ratio of the constitutional unit represented by the formula (2) and the constitutional unit represented by the formula (3) may be 80% by mole or greater or 90% by mole or greater. Further, the upper limit thereof may be 99.5% by mole or less or 99% by mole or less in a case where the polyfunctional vinyl monomer is added in the above-described molar ratio.

According to the present embodiment, a polymer which does not contain a reactive silyl group is used as the (meth)acrylate polymer. In other words, according to the present embodiment, since fine particles are not blended as a reinforcing filler that substitutes for silica, a (meth)acrylate polymer constituting the fine particles which do not contain a reactive silyl group in the molecular terminal or the molecular chain is used. In this manner, it is considered that the effect of the present embodiment of improving the balance between the wet grip performance and the rolling resistance performance while suppressing degradation of hardness at normal temperature and an increase in modulus of elasticity at a low temperature can be effectively exhibited. Here, the reactive silyl group is a functional group represented by Formula ≡Si—X (in the formula, X represents a hydroxyl group or a hydrolyzable group) and has a structure in which 1 to 3 hydroxyl groups or hydrolyzable monovalent groups are bonded to tetravalent silicon atoms. X may represent a hydroxyl group, an alkoxyl group, or a halogen atom.

According to the present embodiment, the glass transition point (Tg) of fine particles formed of the (meth)acrylate polymer is set to be in a range of 70° C. to 0° C. The glass transition point can be set using a monomer composition or the like that constitutes the (meth)acrylate polymer. In a case where the glass transition point thereof is 0° C. or lower, degradation of low temperature performance can be more effectively suppressed. Further, in a case where the glass transition point thereof is −70° C. or higher, the effect of improving the wet grip performance can be increased. The glass transition point of fine particles is preferably in a range of −50° C. to −10° C. and more preferably in a range of −40° C. to −20° C.

According to the present embodiment, the average particle diameter of the fine particles is 10 nm or greater and less than 100 nm. By adding the (meth)acrylate polymer having the above-described specific constitutional unit to diene rubber as such fine particles, the effect of improving the wet grip performance while suppressing degradation of hardness at normal temperature, an increase in modulus of elasticity at a low temperature, and degradation of rolling resistance performance can be increased. The average particle diameter of the fine particles is more preferably in a range of 20 to 90 nm and more preferably in a range of 30 to 80 nm.

According to an embodiment, the fine particles may be formed of a polymer containing at least one functional group selected from the group consisting of a nitrile group, an amino group, a carboxyl group, an epoxy group, and a hydroxyl group. Here, as these functional groups, groups contained as a part of the reactive silyl group are excluded. By blending polymer fine particles containing these specific functional groups, the dispersibility of fine particles and silica can be improved due to an interaction (the, concept including intermolecular force or affinity of a hydrogen bond or the like) between fine particles and an interaction between fine particles and silica. Therefore, the balance between low fuel consumption and wet grip performance when the rubber composition is used for a tire can be improved.

Here, the amino group may be not only a primary amino group but also a secondary amino group or a tertiary amino group. In a case of a secondary or tertiary amino group, the total number of carbon atoms in a hydrocarbon group serving as a substituent is preferably 15 or less and more preferably 10 or less. As an epoxy group, a glycidyl group is exemplified.

The method of introducing these functional groups into the (meth)acrylate polymer is not particularly limited and, for example, a vinyl monomer having the functional groups (hereinafter, referred to as a functional group-containing vinyl monomer) may be copolymerized with the alkyl (meth)acrylate. Examples of the functional group-containing vinyl monomer include the followings. As the vinyl monomer containing a nitrile group, acrylonitrile or methacrylonitrile is exemplified. Examples of the vinyl monomer containing an amino group include 2-(dimethylamino)ethyl acrylate, 2-(dimethylamino)ethyl methacrylate, 2-(diethylamino)ethyl acrylate, 2-(diethylamino)ethyl methacrylate, 2-aminoethyl acrylate, 2-aminoethyl methacrylate, and butylaminoethyl methacrylate. Examples of the vinyl monomer containing a carboxyl group include acrylic acid and methacrylic acid. Examples of the vinyl monomer containing an epoxy group include glycidyl acrylate, glycidyl methacrylate, methyl [(3,4-epoxycyclohexane)-1-yl] acrylate, and methyl [(3,4-epoxycyclohexane)-1-yl] methacrylate. Examples of the vinyl monomer containing a hydroxyl group include 2-hydroxyethyl acrylate, 2-hydroxyethyl methacrylate, 2-hydroxypropyl acrylate, 2-hydroxypropyl methacrylate, 2-hydroxybutyl acrylate, and 2-hydroxybutyl methacrylate. These functional group-containing vinyl monomers may be used alone or in combination of two or more kinds thereof.

The copolymer obtained by using such a functional group-containing vinyl monomer has a constitutional unit (preferably a constitutional unit represented by the formula (2) and/or the formula (3)) represented by the formula (1) and a constitutional unit represented by the following general formula (10).

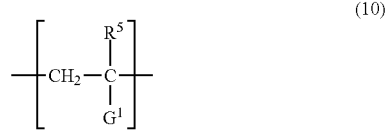

In the formula (10), $R^5$ represents a hydrogen atom or a methyl group (preferably a methyl group), and $R^5$ present in the same molecule may be the same or different. $G^1$ represents a group containing a nitrile group (—CN), a group containing an amino group, a group containing a carboxyl group (—COOH), a group containing an epoxy group, or a group containing a hydroxyl group (—OH), and $G^1$ present in the same molecule may be the same or different. According to an embodiment, $G^1$ may represent a nitrile group or —COOG$^2$. Here, $G^2$ may represent a hydrogen atom, a glycidyl group, an epoxycyclohexyl group, —G$^3$—NG$^4$G$^5$, or —G$^6$—OH. $G^3$ represents an alkylene group having 1 to 5 carbon atoms (preferably 2 to 4 carbon atoms), and $G^4$ and $G^5$ each independently represent a hydrogen atom or an alkyl group having 1 to 5 carbon atoms (preferably 1 to 3 carbon atoms). $G^6$ represents an alkylene group having 1 to 5 carbon atoms (preferably 2 to 4 carbon atoms).

The (meth)acrylate polymer containing such a functional group may be a copolymer of the alkyl (meth)acrylate and the functional group-containing vinyl monomer or a polymer having a cross-linked structure formed by cross-linking the alkyl (meth)acrylate and the functional group-containing vinyl monomer in the presence of a polyfunctional vinyl monomer. In other words, the (meth)acrylate polymer has a constitutional unit represented by the formula (1), a constitutional unit represented by the formula (10), and as constitutional unit derived from a polyfunctional vinyl monomer and has a cross-linked structure using the constitutional unit derived from the polyfunctional vinyl monomer as a cross-linking point.

In the (meth)acrylate polymer containing a functional group, the molar ratio of the constitutional unit represented by the formula (1) to all constitutional units (all repeating units) is preferably 50% by mole or greater and more preferably 60% by mole or greater. Further, the molar ratio thereof is preferably 90% by mole or less and more preferably 85% by mole or less. The molar ratio of the constitutional unit represented by the formula (10) is preferably 5% by mole or greater, more preferably 10% by mole or greater, and still more preferably 14% by mole or greater. Further, the molar ratio thereof is preferably 40% by mole or less and more preferably 30% by mole or less. The molar ratio of the constitutional unit based on the polyfunctional vinyl monomer may be in a range of 0.5% to 20% by mole, in a range of 1% to 10% by mole, or in a range of 1% to 5% by mole. Further, in a case of the polymer having a constitutional unit represented by the formula (2), the molar ratio of the constitutional unit represented by the formula (2) to all constitutional units of the polymer is preferably 25% by mole or greater, more preferably 35% by mole or greater, and may be 50% by mole or greater. Further, the molar ratio thereof is preferably 90% by mole or less and may be 80% by mole or less.

A method of producing the fine particles is not particularly limited and, for example, fine particles can be produced through synthesis using known emulsion polymerization. A preferred example thereof is as follows. In other words, (meth)acrylate and a polyfunctional vinyl monomer serving as a cross-linking agent are dispersed in an aqueous medium such as water in which an emulsifier is dissolved, a water-soluble radical polymerization initiator (for example, a peroxide such as potassium persulfite) is added to the obtained emulsion to perform radical polymerization, and thus fine particles formed of a (meth)acrylate polymer are generated in the aqueous medium. Therefore, fine particles are obtained by being separated from the aqueous medium. As other methods of producing fine particles, polymerization methods such as known suspension polymerization, dispersion polymerization, precipitation polymerization, miniemulsion polymerization, soap-free emulsification polymerization (emulsifier-free emulsification polymerization), and microemulsion polymerization can be used.

In the rubber composition according to the present embodiment, the amount of fine particles formed of the (meth)acrylate polymer to be blended is not particularly limited, but is preferably in a range of 1 to 100 parts by mass, more preferably in a range of 2 to 50 parts by mass, still more preferably in a range of 3 to 30 parts by mass, and may be in a range of 5 to 20 parts by mass per 100 parts by mass of the rubber component comprising diene rubber.

(c) Other Components

Various additives typically used in a rubber composition, such as a reinforcing filler, a silane coupling agent, oil, zinc oxide, stearic acid, an antioxidant, a wax, a vulcanizing agent, and a vulcanization accelerator, can be blended with the rubber composition according to the present embodiment in addition to the fine particles formed of the (meth)acrylate polymer.

Silica or carbon black is preferably used as the reinforcing filler. It is more preferable to use silica in order to improve the balance between rolling resistance performance and wet grip performance, and it is preferable to use silica alone or a combination of silica and carbon black. The amount of the reinforcing filler to be blended is not particularly limited and may be in a range of 20 to 150 parts by mass or in a range of 30 to 100 parts by mass per 100 parts by mass of the rubber component.

The type of silica is not particularly limited, and wet silica such as wet type precipitation method silica or wet gel method silica is preferably used. The BET specific surface area of silica (measurement is carried out in conformity with the BET method described in JIS K6430) is not particularly limited and may be in a range of 90 to 250 m$^2$/g or in a range of 150 to 220 m$^2$/g.

The amount of silica to be blended is not particularly limited and can be appropriately set according to the applications thereof. The amount thereof may be in a range of 20 to 150 parts by mass, in a range of 20 to 100 parts by mass, in a range of 30 to 100 parts by mass, or in a range of 40 to 90 parts by mass per 100 parts by mass of the rubber component.

In a case of blending silica, it is preferable to use a silane coupling agent such as sulfide silane or mercaptosilane. In this case, the amount of the silane coupling agent to be blended is preferably in a range of 2% to 20% by mass and more preferably in a range of 4% to 15% by mass with respect to the mass of silica.

The carbon black is not particularly limited. For example, carbon black having a specific surface area by nitrogen adsorption ($N_2SA$) (JIS K6217-2) of 30 to 120 $m^2/g$ may be used, and specific examples thereof include ISAF grade (N200 Series), HAF grade (N300 Series). FEF grade (N500 Series), and GPF grade (N600 Series) (those are ASTM grades).

Sulfur is preferably used as the vulcanizing agent. The amount of the vulcanizing agent to be blended is not particularly limited, but is preferably in a range of 0.1 to 10 parts by mass and more preferably in a range of 0.5 to 5 parts by mass per 100 parts by mass of the rubber component. Further, examples of the vulcanization accelerator include various vulcanization accelerators such as a sulfonamide-based vulcanization accelerator, a thiuram-based vulcanization accelerator, a thiazole-based vulcanization accelerator, and a guanidine-based vulcanization accelerator, and these may be used alone or in combination of two or more kinds thereof. The amount of the vulcanization accelerator to be blended is not particularly limited, but is preferably in a range of 0.1 to 7 parts by mass and more preferably in a range of 0.5 to 5 parts by mass per 100 parts by mass of the rubber component.

(d) Preparation and Applications of Rubber Composition

The rubber composition according to the first embodiment can be prepared by being kneaded according to a conventional method using a mixer such as a Banbury mixer, a kneader, or a roll which has been typically used. In other words, for example, the fine particles and additives other than a vulcanizing agent and a vulcanization accelerator are added to and mixed with diene rubber in the first mixing stage, and a vulcanizing agent and a vulcanization accelerator are added to and mixed with the obtained mixture in the final mixing stage, thereby preparing the rubber composition.

The rubber composition obtained in the above-described manner can be used for various rubber members such as a lubber member for a tire, a rubber member for anti-vibration rubber, and a rubber member for a conveyor belt. It is preferable that the rubber composition is used for a tire, and examples of a tire include pneumatic tires used for various applications and having various sizes, such as tires for passenger cars and large tires of trucks and buses. As a site of a tire for applying the rubber composition, each portion of a tire such as a tread portion or a side wall portion is exemplified. The pneumatic tire according to an embodiment includes a rubber portion formed of the rubber composition. It is more preferable that the rubber composition is used for tread rubber constituting the ground plane of the pneumatic tire. In other words, it is preferable that the rubber composition is used for a tire tread. A pneumatic tire is produced by forming the rubber composition in a predetermined shape through extrusion processing or the like according to a conventional method, preparing a green tire by combining the rubber composition with other components, performing vulcanization molding on the green tire in a temperature range of 140° C. to 180° C.

(e) First Application Example

A rubber composition according to a first application example contains 1 to 30 parts by mass of the fine particles per 100 parts by mass of a rubber component that contains natural rubber (NR) and/or synthetic isoprene rubber (IR), and styrene-butadiene rubber (SBR) having a glass transition point (Tg) of −70° C. to −20° C. Hereinafter, SBR having a Tg of −70° C. to −20° C. is referred to as SBR-A. According to the first application example, wet grip performance can be improved while a decrease in operation stability of a tire is suppressed.

These NR, IR, and SBR-A may be respectively used alone or in combination of two or more kinds thereof. It is preferable to use NR and SBR-A. The proportion of these rubbers in 100 parts by mass of the rubber component is not particularly limited: for example, NR and/or IR may be in a range of 20 to 70 parts by mass and SBR-A may be in a range of 80 to 30 parts by mass; NR and/or IR may be in a range of 20 to 50 parts by mass and SBR-A may be in a range of 80 to 50 parts by mass; and NR and/or IR may be in a range of 20 to 40 parts by mass and SBR-A may be in a range of 80 to 60 parts by mass.

The glass transition point of SBR-A is more preferably in a range of −60° C. to −30° C. and may be in a range of −50° C. to −30° C. The glass transition point is a value obtained by performing measurement under a temperature rising rate of 20° C./min (range of measurement temperature: −150° C. to 50° C.) according to a differential scanning calorimetry (DSC) method in conformity with JIS K7121.

The above-described modified diene rubber may be used as NR, IR, or SBR-A. As the modified diene rubber, modified SBR-A formed by modifying SBR-A is preferable and modified SBR-A formed by being modified using an amino group and/or an alkoxysilyl group may be used as an embodiment. According to an embodiment, the rubber component may contain unmodified SBR-A, modified SBR-A, and NR and/or IR. For example, 100 parts by mass of the rubber component may contain 10 to 40 parts by mass of unmodified SBR-A, 10 to 40 parts by mass of modified SBR-A, and 20 to 50 parts by mass NR or may contain 20 to 40 parts by mass of unmodified SBR-A, 20 to 40 parts by mass of modified SBR-A, and 20 to 40 parts by mass of NR. In addition, the rubber component may contain diene rubber other than the above-described diene rubber within the range not impairing the effects of the present embodiment.

According to the first application example, the amount of the fine particles to be blended is in a range of 1 to 30 parts by mass, more preferably in a range of 5 to 25 parts by mass, and may be in a range of 8 to 20 parts by mass per 100 parts by mass of the rubber component.

It is preferable that 20 to 150 parts by mass of silica and 1 to 70 parts by mass of carbon black are blended into the rubber composition of the first application example per 100 parts by mass of the rubber component. The amount of silica to be blended is preferably in a range of 30 to 100 parts by mass and more preferably in a range of 50 to 100 parts by mass per 100 parts by mass of the rubber component. The amount of carbon black to be blended is preferably in a range it 5 to 40 parts by mass per 100 parts by mass of the rubber component.

According to the first application example, it is preferable that the reinforcing filler contains silica as at main component, that is, greater than 50% by mass of the reinforcing filler is formed of silica and more preferable that 60% by mass or greater of the reinforcing filler is formed of silica.

(f) Second Application Example

A rubber composition according to a second application example contains 1 to 30 parts by mass of the fine particles per 100 parts by mass of a rubber component that contains styrene-butadiene rubber (in other words, the above-described SBR-A) having a glass transition point of −70° C. to −20° C. and butadiene rubber (BR). According to the second application example, wet grip performance can be improved while degradation of snow performance of a tire is suppressed.

The rubber component may further contain natural rubber (NR) and/or synthetic isoprene rubber (IR). In other words, the rubber component may contain SBR-A, BR, and NR and/or IR and, for example, the rubber component may contain SBR-A, BR, and NR. In addition, the rubber component may contain diene rubber other than the above-described diene rubber within the range not impairing the effects of the present embodiment.

The proportion of these rubbers in 100 parts by mass of the rubber component is not particularly limited: for example, SBR-A may be in a range of 20 to 80 parts by mass, BR may be in a range of 20 to 60 parts by mass, and NR and/or IR ma be in a range of 0 to 30 parts by mass; SBR-A may be in a range of 40 to 70 parts by mass. BR may be in a range of 30 to 50 parts by mass, and NR and/or IR may be in a range of 0 to 20 parts by mass; and SBR-A may be in a range of 45 to 65 parts by mass, BR may be in a range of 30 to 50 parts by mass, and NR and/or IR may be in a range of 5 to 15 parts by mass.

The glass transition point of SBR-A is more preferably in a range of −60° C. to −30° C. and may be in a range of −50° C. to −30° C. Further, the above-described modified diene rubber may be used as SBR-A, BR, NR, or IR. As the modified diene rubber, modified SBR-A timed by modifying SBR-A is preferable and modified SBR-A formed by being modified using an amino group anchor an alkoxysilyl group may be used as an embodiment.

According to the second application example, the amount of the fine particles to be blended is in a range of 1 to 30 parts by mass, more preferably in a range of 5 to 25 parts by mass, and may be in a range of 8 to 20 parts by mass per 100 parts by mass of the rubber component.

It is preferable that 20 to 150 parts by mass of the reinforcing filler containing carbon black is blended into the rubber composition of the second application example per 100 parts by mass of the rubber component. As the reinforcing filler, carbon black may be used alone or carbon black and silica may be used in combination. The amount of the reinforcing filler to be blended is preferably in a range of 50 to 100 parts by mass and may be in a range of 60 to 90 parts by mass per 100 parts by mass of the rubber component. The amount of carbon black to be blended is preferably in a range of 1 to 100 parts by mass, more preferably in a range of 5 to 90 parts by mass, and may be in a range of 40 to 85 parts by mass per 100 parts by mass of the rubber component. The amount of silica to be blended is preferably in a range of 0 to 140 parts by mass and may be in a range of 20 to 100 parts by mass or in a range of 40 to 80 parts by mass per 100 parts by mass of the rubber component.

According to the second application example, the reinforcing filler may contain carbon black as a main component (that is, greater than 50% by mass of the reinforcing filler is formed of carbon black) or contain silica as a main component (that is, greater than 50% by mass of the reinforcing filler is formed of silica).

The applications of the rubber composition according to the second application example are not particularly limited, and the rubber composition can be suitably used for tread rubber of a snow tire that requires snow performance.

(g) Third Application Example

A rubber composition according to a third application example contains 5 to 50 parts by mass of paraffin-based oil and 1 to 30 parts by mass of the fine particles per 100 parts by mass of a rubber component comprising diene rubber.

According to the third application, example, a loss factor tanδ at around 0° C. is improved without impairing the flexibility at a low temperature due to the fine particles so that the wet grip performance can be improved. In addition, the effect can be increased by using paraffin-based oil in combination. Therefore, the wet grip performance can be improved while degradation of ice performance is suppressed.

The paraffin-based oil is oil in which the content ratio (% $C_p$) of a paraffin component according to a ring analysis method (n-d-M) is 50% or greater, and paraffin-based mineral oil that is commercially available as paraffin-based process oil can be used as the paraffin-based oil. The amount of the paraffin-based oil to be blended is preferably in a range of 10 to 40 parts by mass and may be in a range of 20 to 30 parts by mass per 100 parts by mass of the rubber component.

According to the third application example, the amount of the fine particles to be blended is in a range of 1 to 30 parts by mass, more preferably in a range of 5 to 25 parts by mass, and may be in a range of 8 to 20 parts by mass per 100 parts by mass of the rubber component.

According to the third application example, it is preferable that the rubber component contains natural rubber and butadiene rubber, more preferable that 100 parts by mass of the rubber component contains 30 to 70 parts by mass of natural rubber and 30 to 70 parts by mass of butadiene rubber, and still more preferable that 100 parts by mass of the rubber component contains 30 to 60 parts by mass of natural rubber and 40 to 70 parts by mass of butadiene rubber.

In the rubber composition according to the third application example, as the reinforcing filler, silica, and/or carbon black is preferably used and a combination of silica and carbon black is more preferably used. The amount of silica to be blended may be in a range of 10 to 100 parts by mass or in a range of 20 to 50 parts by mass per 100 parts by mass of the rubber component. The amount of carbon black to be blended may be in a range of 10 to 100 parts by mass or in a range of 20 to 50 parts by mass per 100 parts by mass of the rubber component.

In order to improve ice performance, an anti-slipping material (for example, a vegetable granular material such as a walnut ground product or a ground product of a porous carbonized material of a vegetable such as a bamboo charcoal ground product) may be blended into the rubber composition according to the third application example.

The applications of the rubber composition according to the third application example are riot particularly limited, and the rubber composition is suitably used for tread rubber of a studless tire because the ice performance is excellent.

(h) Fourth Application Example

A rubber composition according to a fourth application example contains 50 to 150 parts by mass of carbon black having a specific surface area by nitrogen adsorption of 140 to 250 m²/g and 1 to 30 parts by mass of the fine particles per 100 parts by mass of a rubber component comprising diene rubber. A petroleum resin may be blended into the rubber composition of the fourth application example. According to the fourth application example, in the rubber composition in which operation stability is improved by blending carbon black having a small particle diameter, a loss factor tanδ at around 0° C. is improved by blending the fine particles without impairing the operation stability so that the wet grip performance can be improved. In addition, the stickiness of unvulcanized rubber caused by blending the petroleum resin is suppressed by blending the fine particles so that the processability can be improved.

According to the fourth application example, it is preferable that the rubber composition contains styrene-butadiene rubber as the rubber component, in other words, the rubber component may be formed of only styrene-butadiene rubber or a combination of styrene-butadiene rubber and another diene rubber. As an example, it is preferable that 100 parts by mass of the rubber component contains 80 to 100 parts by mass of styrene-butadiene rubber. As another diene rubber, butadiene rubber and/or natural rubber is preferable.

According to the fourth application example, carbon black having a specific surface area by nitrogen adsorption ($N_2SA$) (JIS K6217-2) of 140 to 250 $m^2/g$ and an extremely small particle diameter is used. By using carbon black having such a small particle diameter, reinforcing properties are improved so that the operation stability can be increased. The specific surface area by nitrogen adsorption of carbon black is preferably in a range of 160 to 220 $m^2/g$ and more preferably in a range of 180 to 200 $m^2/g$. The amount of the carbon black is preferably in a range of 60 to 120 parts by mass and more preferably in a range of 70 to 100 parts by mass per 100 parts by mass of the rubber component.

According to the fourth application example, the reinforcing filler may be formed of only the carbon black or formed by blending carbon black with silica. The amount of silica to be blended is not particularly limited, but may be 50 parts by mass or less or in a range of 10 to 30 parts by mass per 100 parts by mass of the rubber component.

According to the fourth application example, the amount of the fine particles to be blended is in a range of 1 to 30 parts by mass, more preferably in a range of 5 to 25 parts by mass, and may be in a range of 8 to 20 parts by mass per 100 parts by mass of the rubber component.

20 to 80 parts by mass of a petroleum resin may be blended into the rubber composition of the fourth application example per 100 parts by mass of the rubber component. The softening point (JIS K2207, ring and ball type) of the petroleum resin is in a range of about 70° C. to 120° C. and grip performance can be improved by blending a resin that is softened at such a high temperature. The processability is degraded due to the stickiness of unvulcanized rubber when the petroleum resin is blended into the rubber composition. However, according to the fourth application example, the processability can be improved by blending fine particles formed of the (meth)acrylate polymer.

Examples of the petroleum resin include an aliphatic petroleum resin, an aromatic petroleum resin, and aliphatic/aromatic copolymer petroleum resin. The aliphatic petroleum resin is a resin obtained by performing cationic polymerization on an unsaturated monomer such as isoprene or cyclopentadiene which is a petroleum fraction (C5 fraction) corresponding to 4 or 5 carbon atoms also referred to as a C5-based petroleum resin) and may be hydrogenated. The aromatic petroleum resin is a resin obtained by performing cationic polymerization on a monomer such as vinyl toluene, alkyl styrene, or indene which is a petroleum fraction (C9 fraction) corresponding to 8 to 10 carbon atoms (also referred to as a C9-based petroleum resin) and may be hydrogenated. The aliphatic/aromatic copolymer petroleum resin is a resin obtained by copolymerizing the C5 fraction and C9 fraction (also referred to as a C5/C9-based petroleum resin) and may be hydrogenated.

The amount of the petroleum resin to be blended is preferably in a range of 30 to 60 parts by mass and may be in a range of 40 to 60 parts by mass per 100 parts by mass of the rubber component.

The applications of the rubber composition according to the fourth application example are not particularly limited, and the rubber composition is suitably used for tread rubber of a tire for motor sports.

[Second and Third Embodiments]

According to second and third embodiments, a rubber composition is formed by blending fine particles formed of a specific polymer with a rubber component formed of diene rubber.)

(i) Rubber Component

Similar to the first embodiment, examples of the diene rubber as the rubber component include NR, IR, BR, SBR, NBR, CR, HR, styrene-isoprene copolymer rubber, butadiene-isoprene copolymer rubber, and styrene-isoprene-butadiene copolymer rubber. These may be used alone or in combination of two or more kinds thereof. Among these, at least one selected from the group consisting of NR, BR, and SBR is preferable. The fine particles do not belong to the rubber component.

The specific examples of each diene rubber exemplified above also include modified diene rubber which is modified using at least one functional group by introducing the at least one functional group selected from the group consisting of a hydroxyl group, an amino group, a carboxyl group, an alkoxy group, an alkoxysilyl group, and an epoxy group into the molecular terminal or the molecular chain thereof. As the modified diene rubber, modified SBR and/or modified BR is preferable. According to an embodiment, the diene rubber may be formed of only modified diene rubber or a combination of modified diene rubber and unmodified diene rubber. For example, 100 parts by mass of the diene rubber may comprise 30 parts by mass or greater of modified SBR, or may comprise 50 to 90 parts by mass of modified SBR and 50 to 10 parts by mass of unmodified diene rubber (for example, BR and/or NR).

(j) Fine Particles

Fine particles which are formed of a polymer having a constitutional unit (also referred to as a repeating unit) represented by the following general formula (4) are used a the fine particles.

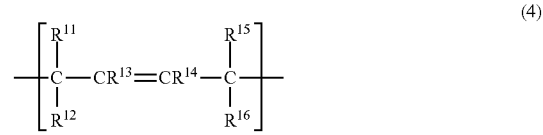

(4)

In the formula (4), $R^{11}$, $R^{12}$, $R^{13}$, $R^{14}$, $R^{15}$, and $R^{16}$ may be the same as or different from each other, at least one thereof represents an aliphatic hydrocarbon group having 3 to 8 carbon atoms, and the remainder represents a hydrogen atom or an aliphatic hydrocarbon group having 1 or 2 carbon atoms. It is preferable that one of $R^{11}$, $R^{12}$, $R^{13}$, $R^{14}$, $R^{15}$, and $R^{16}$ represents an aliphatic hydrocarbon group having 3 to 8 carbon atoms, 0 to 2 thereof represent an aliphatic hydrocarbon group having 1 or 2 carbon atoms, and 3 to 5 of the remainder represent a hydrogen atom.

An unsaturated aliphatic hydrocarbon group having at least one double bond is preferable as the aliphatic hydrocarbon group having 3 to 8 carbon atoms and may be linear or branched. A branched unsaturated hydrocarbon group which contains one methyl group as a side chain and has one or two double bonds is preferable. The number of carbon atoms of the aliphatic hydrocarbon group is preferably in a range of 4 to 6. Preferred specific examples thereof include a 4-methyl-3-pentenyl group, a 3-methyl-2-butenyl group, a 3-methyl-3-butenyl group, a 2-methyl-1-propenyl group, and a 2-methyl-1,3-butadienyl group.

As the aliphatic hydrocarbon group having 1 or 2 carbon atoms, a saturated aliphatic hydrocarbon group, that is, a methyl group or an ethyl group is preferable and a methyl group is more preferable.

According to a preferred embodiment, any one of $R^{11}$, $R^{12}$, and $R^{13}$ in $R^{11}$, $R^{12}$, $R^{13}$, $R^{14}$, $R^{15}$, and $R^{16}$ represents an unsaturated aliphatic hydrocarbon group having 3 to 8 carbon atoms (preferably 4 to 6 carbon atoms) five of the remainder may be the same as or different from each other and represent a hydrogen atom or a methyl group, and at least one of $R^{15}$ and $R^{16}$ represents a hydrogen atom.

According to an embodiment, $R^{11}$, $R^{12}$, $R^{14}$, $R^{15}$, and $R^{16}$ may represent a hydrogen atom and $R^{13}$ may represent a 4-methyl-3-pentenyl group (the following constitutional unit derived from β-myrcene). In addition, according to another embodiment, any one of $R^{11}$ and $R^{12}$ may represent a hydrogen atom, the other may represent a 3-methyl-2-butenyl group, $R^{13}$ may represent a methyl group, and $R^{14}$, $R^{15}$, and $R^{16}$ may represent a hydrogen atom (the following constitutional unit derived from β-ocimene).

Examples of the constitutional unit represented by the formula (4) include a trans-type constitutional unit represented by the following general formula (4A) and/or a cis-type constitutional unit represented by the following general formula. (4B).

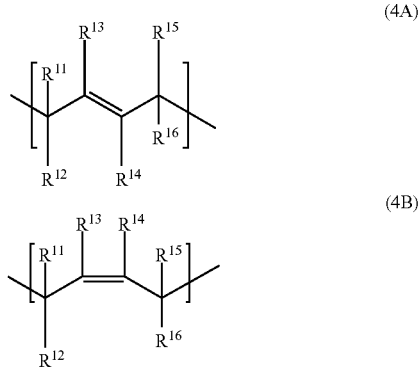

The constitutional unit represented by the formula (4) is a constitutional unit derived from a compound represented by the following general formula (7), in other words, the constitutional unit represented by the formula (4) is a monomer unit formed by using the compound represented by the formula (7) as a monomer and reacting the compound.

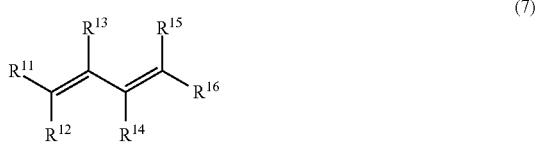

$R^{11}$, $R^{12}$, $R^{13}$, $R^{14}$, $R^{15}$, and $R^{16}$ in the formula (7) have the same definitions as those for $R^{11}$, $R^{12}$, $R^{13}$, $R^{14}$, $R^{15}$, and $R^{16}$ in the formula (4).

The compound represented by the formula (7) is a compound (hereinafter, a conjugated diene-containing compound) containing an aliphatic hydrocarbon group having 3 to 8 carbon atolls which is bonded to a conjugated diene structure. Specific examples thereof include 2-methyl-4-methylenehexa-1,5-diene, 2-methyl-6-methyleneocta-1,7-diene (that is, α-myrcene), 2-methyl-8-methylenedeca-1,9-diene, 5-methyl-3-methylenehexa-1,4-diene, 7-methyl-3-methyleneocta-1,6-diene (that is, β-myrcene), 9-methyl-3-methylenedeca-1,8-diene, 3,7-dimethylocta-1,3,7-triene (that is, α-ocimene), 3,9-dimethyldeca-1,3,9-trien, 3,7-dimethylocta-1,3,6-triene (that is,) β-ocimene), 3,9-dimethyldeca-1,3,8-triene, 2,6-dimethylocta-2,4,6-triene (that is, alloocimene) 2,8-dimethyldeca-2,6,8-triene, and 2,6-dimethylocta-1,3,5,7-tetraene (that is, cosmene). These may be used alone or in combination of two or more kinds thereof. Among these, at least one selected from the group consisting of myrcene, ocimene, alloocimene, and cosmene is preferable, and at least one selected from the group consisting of myrcene and ocimene is more preferable. The myrcene may be α-myrcene, β-myrcene, or a mixture of these. The ocimene may be α-ocimene, β-ocimene (a trans-type or a cis-type), or a mixture of these. The conjugated diene-containing compound according to the preferred embodiment is at least one selected from the group consisting of β-myrcene and β-ocimene.

Examples of the constitutional unit formed of the compound represented by the formula (7) may include only a constitutional unit represented by the formula (4). However, since there is a case where a constitutional unit represented by the following general formula (11) and/or a constitutional unit represented by the following general formula (12) is formed, examples thereof may include these constitutional units.

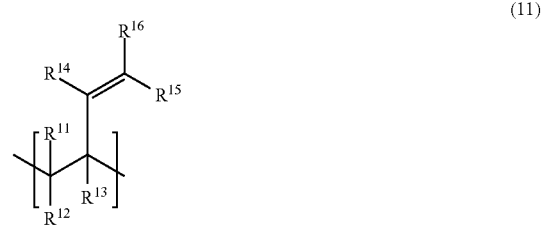

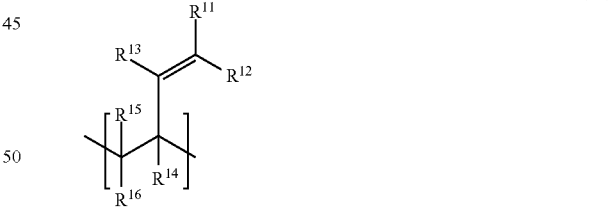

$R^{11}$, $R^{12}$, $R^{13}$, $R^{14}$, $R^{15}$, and $R^{16}$ in the formulae (11) and (12) have the same definitions as those for $R^{11}$, $R^{12}$, $R^{13}$, $R^{14}$, $R^{15}$, $R^{16}$ in the formula (4).

The proportion of each constitutional unit represented by the formulae (4), (11), and (12) is not particularly limited. However, since the constitutional unit represented by the formula (4) is typically mainly formed, the proportion of the constitutional unit represented by the formula (4) may be in a range of 60% to 100% by mole or in a range of 70% to 90% by mole with respect to the proportion of the constitutional unit derived the compound represented by the formula (7) (in other words, the proportion is set to 100% by mole). Further, the proportion of the constitutional unit represented by the formula (11) may be in a range of 0% to 20% by mole or in a range of 3% to 15% by mole. Further, the proportion of the constitutional unit represented by the formula (12) may be in a range of 0% to 30% by mole or in a range of 5% to 25% by mole.

As the polymer constituting the fine particles, a polymer having a constitutional unit represented by the formula (4) and a constitutional unit represented by the following general formula (5) may be used. The addition forms of these constitutional units may be random addition or block addition, and random addition is preferable.

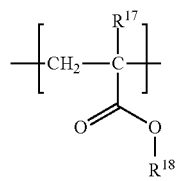
(5)

In the formula (5), $R^{17}$ represents a hydrogen atom or a methyl group and preferably a methyl group. $R^{18}$ represents an alkyl group having 1 to 18 carbon atoms and may be linear or branched. $R^{18}$ represents more preferably an alkyl group having 1 to 8 carbon atoms.

The alkyl (meth)acrylate unit represented by the formula (5) is a constitutional unit derived from a compound represented by the following general formula (8), in other words, the alkyl (meth)acrylate unit represented by the formula (5) is a monomer unit formed by using the compound represented by the formula (8) as a monomer and reacting the compound.

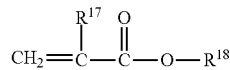
(8)

$R^{17}$ and $R^{18}$ in the formula (8) have the same definitions as those for $R^{17}$ and $R^{18}$ in the formula (5).

Examples of the compound represented by the formula (8) (hereinafter, alkyl (meth)acrylate) include methyl (meth)acrylate, ethyl (meth)acrylate, propyl (meth)acrylate, isopropyl (meth)acrylate, n-butyl (meth)acrylate, t-butyl (meth)acrylate, 2-ethylhexyl (meth)acrylate, isopentyl (meth)acrylate, isodecyl (meth)acrylate, n-dodecyl (meth)acrylate, n-tridecyl (meth)acrylate, and n-stearyl (meth)acrylate. These may be used alone or in combination of two or more kinds thereof. Among these, methyl methacrylate is preferable.

As the polymer constituting the fine particles, a polymer having a constitutional unit represented by the formula (4) and a constitutional unit represented by the following general formula (6) may be used. The addition forms of these constitutional units may be random addition or block addition, and random addition is preferable.

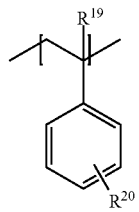
(6)

In the formula (6), $R^{19}$ represents a hydrogen atom or a methyl group and more preferably a hydrogen atom. $R^{20}$ represents a hydrogen atom or an alkyl group having 1 to 8 carbon atoms (in other words, a linear alkyl group having 1 to 8 carbon atoms or a branched alkyl group having 3 to 8 carbon atoms) and more preferably a hydrogen atom or an alkyl group having 1 to 4 carbon atoms. $R^{20}$ may be any of an ortho (o-) position, a meta (m-) position, and a para (p-) position of an aromatic ring and preferably a meta position and/or a para position of an aromatic ring.

The aromatic vinyl unit represented by the formula (6) is a constitutional unit derived from a compound represented by the following general formula (9), in other words, the aromatic vinyl unit represented by the formula (6) is a monomer unit formed by using the compound represented by the formula (9) as a monomer and reacting the compound.

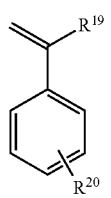
(9)

$R^{19}$ and $R^{20}$ in the formula (9) have the same definitions as those for $R^{19}$ and $R^{20}$ in the formula (6).

Examples of the compound represented by Formula (9) (hereinafter, an aromatic vinyl compound) include styrene, α-methyl styrene, methyl styrene (an ortho position, a meta position, a para position, or a mixture of two or more of these), ethyl styrene (an ortho position, a meta position, a para position, or a mixture of two or more of these), propyl styrene (an ortho position, a meta position, a para position, or a mixture of two or more of these), isopropyl styrene (an ortho position, a meta position, a para position, or a mixture of two or more of these), butyl styrene (an ortho position, a meta position, a para position, or a mixture of two or more of these), isobutyl styrene (an ortho position, a meta position, a para position, or a mixture of two or more of these), t-butyl styrene (an ortho position, a meta position, a para position, or a mixture of two or more of these), s-butyl styrene (an ortho position, a meta position, a para position, or a mixture of two or more of these), pentyl styrene (an ortho position, a meta position, a para position, or a mixture of two or more of these), hexyl styrene (an ortho position, a meta position, a para position, or a mixture of two or more of these), heptyl styrene (an ortho position, a meta position, a para position, or a mixture of two or more of these), and octyl styrene (an ortho position, a meta position, a para position, or a mixture of two or more of these). These may be used alone or in combination of two or more kinds thereof. Among these, at least one selected from the group consisting of styrene, methyl styrene, and tert-butyl styrene is preferable.

As the polymer constituting the fine particles, a polymer having a constitutional unit represented by the formula (4), a constitutional unit represented by the formula (5), and a constitutional unit represented by the formula (6) may be used. The addition forms of these constitutional units may be random addition or block addition, and random addition is preferable.

According to the preferred embodiment, the polymer constituting the fine particles may be formed by polymerizing at least one monomer selected from the group consisting of β-myrcene and β-ocimene and at least one monomer selected from the group consisting of methyl methacrylate, styrene, 4-methyl styrene, and 4-tert-butyl styrene.

The polymer constituting the fine particles may be a homopolymer of a conjugated diene-containing compound represented by the formula (7) or a copolymer of a conjugated diene-containing compound represented by the formula (7) and alkyl (meth)acrylate represented by the formula (8) and or an aromatic vinyl compound represented by the formula (9). According to a more preferred embodiment, the polymer is a polymer having a cross-linked structure formed by cross-linking a monomer containing a conjugated diene-containing compound in the presence of a polyfunctional vinyl monomer. In other words, according to the preferred embodiment, the polymer constituting the fine particles has a constitutional unit represented by the formula (4) (may contain a constitutional unit represented by the formula (5) and/or a constitutional unit represented by the formula (6) in addition to the constitutional unit represented by the formula (4)) and a constitutional unit derived from a polyfunctional vinyl monomer and has a cross-linked structure using the constitutional unit derived from the polyfunctional vinyl monomer as a cross-linking point. As the polyfunctional vinyl monomer, those exemplified in the first embodiment can be used.

In the polymer constituting the fine particles, the proportion of each constitutional unit is not particularly limited. For example, the molar ratio of the constitutional unit represented by the formula (4) to the all constitutional units (all repeating units) constituting the polymer may be 10% by mole or greater, 30% by mole or greater, or 60% by mole or greater. The upper limit of the molar ratio is not particularly limited, but may be 99.5% by mole or less or 99% by mole or less in a case where the above-described polyfunctional vinyl monomer is added. Further, the molar ratio of the constitutional unit derived from a compound represented by the formula (7) to all constitutional unit may be 15% by mole or greater, 45% by mole or greater, or 90% by mole or greater. Further, the upper limit thereof may be 99.5% by mole or less or 99% by mole or less.

The molar ratio of the constitutional unit based on a polyfunctional vinyl monomer to all constitutional units may be in a range of 0.5% to 20% by mole, in a range of 1% to 10% by mole, or in a range of 1% to 5% by mole.

According to the embodiment, in a case where the polymer has a constitutional unit represented by the formula (5) and/or a constitutional unit represented by the formula (6) in addition to a constitutional unit represented by the formula (4), the molar ratio of each constitutional unit to all constitutional units of the polymer may be set as follows. In other words, the molar ratio of the constitutional unit represented by the formula (4) may be in a range of 10% to 80% by mole, and the total molar ratio of the constitutional units represented by the formulae (5) and (6) may be in a range of 5% to 80% by mole. The molar ratio of the constitutional unit represented by the formula (4) is in a range of 30% to 70% by mole, and the total molar ratio of the constitutional units represented by the formulae (5) and (6) may be in a range of 10% to 50% by mole. In this case, the molar ratio of the constitutional unit derived from a compound represented by the formula (7) to all constitutional units may be in a range of 15% to 90% by mole or in a range of 45% to 85% by mole. Further, in a case where the polymer has one of the constitutional unit represented by the formula (5) and the constitutional unit represented by the formula (6), the molar ratio of each constitutional unit to all constitutional units may be in a range of 5% to 80% by mole or in a range of 10% to 50% by mole. Further, in a case where the polymer has both of the constitutional unit represented by the formula (5) and the constitutional unit represented by the formula (6), the molar ratio of the constitutional unit represented by the formula (5) to all constitutional units may be in a range of 3% to 60% by mole and the molar ratio of the constitutional unit represented by the formula (6) to all constitutional units may be in a range of 3% to 60% by mole; and the molar ratio of the constitutional unit represented by the formula (5) to all constitutional units may be in a range of 5% to 30% by mole and the molar ratio of the constitutional unit represented by the formula (6) to all constitutional units may be in a range of 5% to 30% by mole.

The polymer constituting the fine particles has a constitutional unit derived from a compound represented by the formula (7) and a constitutional unit derived from the vinyl monomer (in other words. a compound represented by the formula (8), a compound represented by the formula (9), or a polyfunctional vinyl monomer) which is an optional component, and the total molar ratio of these constitutional units to all constitutional units is preferably 90% by mole or greater, more preferably 95% by mole or greater, and may be 100% by mole.

The glass transition point (Tg) of the fine particles formed of a polymer is set to be in a range of −70° C. to 0° C. The glass transition point can be set based on the monomer composition or the like constituting a polymer. In a case where the glass transition point is 0° C. or lower, degradation of low temperature performance can be effectively suppressed. Further, in a case where the glass transition point is −70° C. or higher, the effect of improving wet grip performance can be increased. The glass transition point of the fine particles is preferably in a range of −50° C. to −10° C. and more preferably in a range of −40° C. to −20° C.

According to the second embodiment, the average particle diameter of fine particles is in a range of 10 to 1000 nm. By adding the polymer having a specific constitutional unit as such fine particles to diene rubber, wet grip performance and rolling resistance performance can be balanced at a high level while degradation of hardness at normal temperature and an increase in modulus of elasticity at a low temperature are suppressed, and thus the wet grip performance can be significantly improved while particularly degradation of rolling resistance performance is suppressed. The average particle diameter of the fine particles is more preferably in a range of 10 to 100 nm and still more preferably in a range of 20 to 80 nm.

The method of producing the fine particles is not particularly limited and, for example, fine particles can be produced through synthesis using known emulsion polymerization. A preferred example is as follows. In other words, a monomer containing a conjugated diene-containing compound represented by the formula (7) and a polyfunctional vinyl monomer serving as a cross-linking agent are dispersed in an aqueous medium such as water in which an emulsifier is dissolved, a water-soluble radical polymerization initiator (for example, a peroxide such as potassium persulfate) is added to the obtained emulsion to perform radical polymerization, and thus fine particles formed of the polymer are generated in the aqueous medium. Therefore, fine particles are obtained by being separated from the aqueous medium. As other methods of producing fine particles, polymerization methods such as known suspension polymerization, dispersion polymerization, precipitation polymerization, mini emulsion polymerization, soap-free emulsification polymerization (emulsifier-free emulsification polymerization), and microemulsion polymerization can be used.

In the rubber composition according to the second embodiment, the amount of free particles to be blended is not particularly limited, but is preferably in a range of 1 to 100 parts by mass, more preferably in a range of 2 to 50 parts by mass, still more preferably in a range of 3 to 30 parts by mass per 100 parts by mass of the rubber component comprising diene rubber.

(k) Other Components and Preparation and Applications of Rubber Composition

Various additives typically used in a rubber composition, such as a reinforcing filler, a silane coupling agent, oil, zinc oxide, stearic acid, an antioxidant, a wax, a vulcanizing agent, and a vulcanization accelerator, can be blended with the rubber composition according to the second embodiment in addition to the fine particles.

Silica such as wet silica and/or carbon black is preferably used as the reinforcing filler. It is more preferable to use silica in order to improve the balance between rolling resistance performance and wet grip performance, and it is preferable to use silica alone or a combination of silica and carbon black. It is preferable that the reinforcing filler contains silica as a main component, in other words, 50% by mass or greater of the reinforcing filler is silica. The amount of the reinforcing filler to be blended is not particularly limited and may be in a range of 20 to 150 parts by mass or in a range of 30 to 100 parts by mass per 100 parts by mass of the rubber component. The amount of silica to be blended is not particularly limited, but may be in a range of 20 to 120 parts by mass or in a range of 30 to 90 parts by mass per 100 parts by mass of the rubber component.

In a case where silica is blended into the rubber composition, it is preferable to use a silane coupling agent in combination. In this case, the amount of the silane coupling agent to be blended is preferably in a range of 2% to 20% by mass and more preferably in a range of 4% to 15% by mass of the mass of silica.

Preferred specific examples of the vulcaniznig agent and the vulcanization accelerator and the amounts thereof to be blended are the same as those in the first embodiment described above, and thus the description thereof will not be repeated. Further, the method of preparing the rubber composition and the applications of the rubber composition are the same as those in the first embodiment described above, and thus the description thereof will not be repeated.

EXAMPLES

[Method of Measuring Average Particle Diameter]

The average particle diameter of fine particles is a particle diameter with an integral value of 50% (50% diameter: D50) in particle size distribution to be measured using a dynamic light scattering method (DLS) and was measured according to a photon correlation method (in conformity with JIS Z8826) using a dynamic light scattering photometer "DLS-8000" (manufactured by Otsuka Electronics Co., Ltd.) (angle between incident light and detector: 90°).

[Method of Measuring Tg]

The Tg of fine particles was measured under a temperature rising rate of 20° C./min (range of measurement temperature: −150° C. to 150° C.) according to a differential scanning calorimetry (DSC) method in conformity with JIS K7121.

Synthesis Example 1

Fine Particles 1

15.0 g of 2,4,6-trimethylheptyl methacrylate, 0.394 g of ethylene glycol dimethacrylate, 1.91 g of sodium dodecyl sulfate, 120 g of water, and 13.5 g of ethanol were mixed, the mixture was stirred for 1 hour to emulsify a monomer, 0.179 g of potassium perfulfate was added thereto, nitrogen bubbling, was performed for 1 hour, and the solution was held under a temperature condition of 70° C. for 8 hours. 14.5 g of fine particles 1 (polymerization conversion ratio (production amount/charge amount): 94%) were obtained by adding methanol to the obtained solution for coagulation. The average particle diameter of fine particles 1 was 60 nm and the Tg thereof was −37° C.

In regard to the fine particles 1, as a result of analyzing the chemical structure of the polymer based on $^{13}$C-NMR, the polymer had a constitutional unit derived from 2,4,6-trimethylheptyl methacrylate and represented by the formula (2) and a constitutional unit derived from ethylene glycol dimethacrylate (hereinafter, an EGDM constitutional unit), and the molar ratio of the constitutional unit represented by the formula (2) was 97% by mole and the molar ratio of the EGDM constitutional unit was 3.0% by mole.

Synthesis Example 2

Fine Particles 2

14.2 g of fine particles 2 (polymerization conversion ratio: 92%) were obtained using 15.0 g of 2-ethylhexyl methacrylate, 0.450 g of ethylene glycol dimethacrylate 2.18 g of sodium dodecyl sulfate, 0.205 g of potassium persulfate. 120 g of water, and 13.5 g of ethanol in the same manner as in Synthesis Example 1. The average particle diameter of fine particles 2 was 58 nm and the Tg, thereof was −10° C. As a result of $^{13}$C-NMR analysis in regard to the fine particles 2, the molar ratio of the constitutional unit derived from 2-ethylhexyl methacrylate and represented by the formula (3) was 97% by mole and the molar ratio of the EGDM constitutional unit was 3.0% by mole.

Synthesis Example 3

Fine Particles 3

14.0 g of fine particles 3 (polymerization conversion ratio: 93%) were obtained using 12.0 g of 2,4,6-trimethylheptyl methacrylate, 2.63 g of 2-ethylhexyl methacrylate (here, the molar ratio of 2,4,6-trimethylheptyl methacrylate/2-ethylhexyl methacrylate was 80/20), 0.394 g of ethylene glycol dimethacrylate, 1.91 g of sodium dodecyl sulfate, 0.179 g of potassium persulfate, 120 g of water, and 13.5 g of ethanol in the same manner as in Synthesis Example 1. The average particle diameter of fine particles 3 was 60 nm and the Tg thereof was −32° C. As a result of $^{13}$C-NMR analysis in regard to the fine particles 3, the molar ratio of the constitutional unit derived from 2,4,6-trimethylheptyl methacrylate and represented by the formula (2) was 78% by mole, the molar ratio of the constitutional unit derived from 2-ethylhexyl methacrylate and represented by the formula (3) was 19% by mole, and the molar ratio of the EGDM constitutional unit was 3.0% by mole.

Synthesis Example 4

Fine Particles 4

14.5 g of fine particles 4 (polymerization conversion ratio: 94%) were obtained using 8.0 g of 2,4,6-trimethylheptyl methacrylate, 7.0 g of 2-ethylhexyl methacrylate (here, the molar ratio of 2,4,6-trimethylheptyl methacrylate/2-ethylhexyl methacrylate was 50/50), 0.420 g of ethylene glycol dimethacrylate, 2.04 g of sodium dodecyl sulfate, 0.191 g of potassium persulfate, 120 g of water, and 13.5 g of ethanol in the same manner as in Synthesis Example 1. The average particle diameter of fine particles 4 was 60 nm and the Tg thereof was −24° C. As a result of $^{13}$C-NMR analysis in regard to the fine particles 4, the molar ratio of the constitutional unit derived from 2,4,6-trimethylheptyl methacrylate and represented by the formula (2) was 49% by mole, the molar ratio of the constitutional unit derived from 2-ethylhexyl methacrylate and represented by the formula (3) was 48% by mole, and the molar ratio of the EGDM constitutional unit was 3.0% by mole.

Synthesis Example 5

Fine Particles 5

13.8 g of fine particles 5 (polymerization conversion ratio: 90%) were obtained using 15.0 g of n-dodecyl methacrylate, 0.351 g of ethylene glycol dimethacrylate, 1.70 g of sodium dodecyl sulfate, 0.159 g of potassium persulfate, 120 g of water, and 13.5 g of ethanol in the same manner as in Synthesis Example 1. The average particle diameter of fine particles 5 was 62 nm and the Tg thereof was −65° C. As a result of $^{13}$C-NMR analysis in regard to the fine particles 5, the molar ratio of the constitutional unit derived from n-dodecyl methacrylate and represented by the formula (1) was 97% by mole and the molar ratio of the EGDM constitutional unit was 3.0% by mole.

Synthesis Example 6

Fine Particles 6

14.6 g of fine particles 6 (polymerization conversion ratio: 93%) were obtained in the same manner as in Synthesis Example 1 except that 0.673 g of trimethylolpropane trimethacrylate was used in place of 0.394 g of ethylene glycol dimethacrylate used for synthesizing the fine particles 1. The average particle diameter of fine particles 6 was 58 nm and the Tg thereof was −36° C. As a result of $^{13}$C-NMR analysis in regard to the fine particles 6, the molar ratio of the constitutional unit represented by the formula (2) was 97% by mole and the molar ratio of the constitutional unit derived from trimethylolpropane trimethacrylate was 3.0% by mole.

Synthesis Example 7

Fine Particles 7

Fine particles 7 were obtained in the same manner as in Synthesis Example 1 except that the amount of water was set to 122 g and the amount of ethanol was set to 13.0 g. The average particle diameter of fine particles 7 was 60 nm and the Tg thereof was −37° C. As a result of $^{13}$C-NMR analysis in regard to the fine particles 7, the molar ratio of the constitutional unit derived from 2,4,6-trimethylheptyl methacrylate and represented by the formula (2) was 97% by mole and the molar ratio of the EGDM constitutional unit was 3% by mole.

Synthesis Example 8

Fine Particles 8

14.0 g of 2,4,6-trimethylheptyl methacrylate, 1.36 g of methacrylonitrile, 0.504 g of ethylene glycol dimethacrylate 2.44 g of sodium dodecyl sulfate, and 135 g of water were mixed, the mixture was stirred for 1 hour to emulsify a monomer, 0.229 g of potassium persulfate was added thereto, nitrogen bubbling was performed for 1 hour, and the solution was held under a temperature condition of 70° C. for 8 hours. Fine particles 8 were obtained by adding methanol to the obtained solution for coagulation. The average particle diameter of fine particles 8 was 60 nm and the Tg thereof was −25° C. As a result of $^{13}$C-NMR analysis in regard to the fine particles 8, the molar ratio of the constitutional unit derived from 2,4,6-trimethylheptyl methacrylate and represented by the formula (2) was 73% by mole, the molar ratio of the constitutional unit derived from methacrylonitrile and represented by the formula (10) was 24% by mole, and the molar ratio of the EGDM constitutional unit was 3% by mole.

Synthesis Example 9

Fine Particles 9

9.50 g of 2,4,6-trimethylheptyl methacrylate, 4.80 g of u-dodecyl methacrylate 0.805 g of methacrylonitrile, 0.446 g of ethylene glycol dimethacrylate, 2.16 g of sodium dodecyl sulfate, and 135 g of water were mixed, the mixture was stirred for 1 hour to emulsify a monomer, 0.203 g of potassium persulfate was added thereto, nitrogen bubbling was performed for 1 hour, and the solution was held under a temperature condition of 70° C. for 8 hours. Fine particles 9 were obtained by adding methanol to the obtained solution for coagulation. The average particle diameter of fine particles 9 was 62 nm and the Tg thereof was −39° C. As a result of $^{13}$C-NMR analysis in regard to the fine particles 9, the molar ratio of the constitutional unit derived from 2,4,6-trimethylheptyl methacrylate and represented by the formula (2) was 56% by mole, the molar ratio of the constitutional unit derived from n-dodecyl methacrylate and represented by the formula (1) was 25% by mole, the molar ratio of the constitutional unit derived from methacrylonitrile and represented by the formula (10) was 16% by mole, and the molar ratio of the EGDM constitutional unit was 3% by mole.

Synthesis Example 10

Fine Particles 10

11.5 g of 2,4,6-trimethylheptyl methacrylate, 3.24 g of 2-(dimethylamino)ethyl methacrylate, 0.438 g of ethylene glycol dimethacrylate, 2.12 g of sodium dodecyl sulfate, and 135 g of water were mixed, the mixture was stirred for 1 hour to emulsify a monomer, 0.199 g of potassium persulfate was added thereto, nitrogen bubbling was performed for 1 hour, and the solution was held under a temperature condition of 70° C. for 8 hours. Fine particles 10 were obtained by adding methanol to the obtained solution for coagulation. The average particle diameter of fine particles 10 was 58 nm and the Tg thereof was −25° C. As a result of $^{13}$C-NMR analysis in regard to the fine particles 10, the molar ratio of the constitutional unit derived from 2,4,6-trimethylheptyl methacrylate and represented by the formula (2) was 69% by mole, the molar ratio of the constitutional unit derived from 2-(dimethylamino)ethyl methacrylate and represented by the formula (10) was 28% by mole, and the molar ratio of the EGDM constitutional unit was 3% by mole.

Synthesis Example 11

Fine Particles 11

12.5 g of 2,4,6-trimethylheptyl methacrylate, 2.30 g of glycidyl methacrylate, 0.438 g of ethylene glycol dimethacrylate, 2.12 g of sodium dodecyl sulfate, and 135 g of water were mixed, the mixture was stirred for 1 hour to emulsify a monomer, 0.199 g of potassium persulfate was added thereto, nitrogen bubbling was performed for 1 hour, and the solution was held under a temperature condition of 70° C. for 8 hours. Fine particles 11 were obtained by adding methanol to the obtained solution for coagulation. The average particle diameter of fine particles 11 was 63 nm and the Tg thereof was −24° C. As a result of $^{13}$C-NMR analysis in regard to the fine particles the molar ratio of the constitutional unit derived from 2,4,6-trimethylheptyl methacrylate and represented by the formula (2) was 75% by mole, the molar ratio of the constitutional unit derived from glycidyl methacrylate and represented by the formula (10) was 22% by mole, and the molar ratio of the EGDM constitutional unit was 3% by mole.

Synthesis Example 12

Fine Particles 12

5.50 g of 2,4,6-trimethylheptyl methacrylate, 7.77 g of n-dodecyl methacrylate, 1.78 g of glycidyl methacrylate, 0.413 g of ethylene glycol dimethacrylate, 2.00 g of sodium dodecyl sulfate, and 135 g of water were mixed, the mixture was stirred for 1 hour to emulsify a monomer, 0.188 g of potassium persulfate was added thereto, nitrogen bubbling was performed for 1 hour, and the solution was held under a temperature condition of 70° C. for 8 hours. Fine particles 12 were obtained by adding methanol to the obtained solution for coagulation. The average particle diameter of fine particles 12 was 60 nm and the Tg thereof was −39° C. As a result of $^{13}$C-NMR analysis in regard to the fine particles 12, the molar ratio of the constitutional unit derived from 2,4,6-trimethylheptyl methacrylate and represented by the formula (2) was 35% by mole, the molar ratio of the constitutional unit derived from n-dodecyl methacrylate and represented by the formula (1) was 44% by mole, the molar ratio of the constitutional unit derived from glycidyl methacrylate and represented by the formula (10) was 18% by mole, and the molar ratio of the EGDM constitutional unit was 3% by mole.

Synthesis Example 13

Fine Particles 13

14.0 g of 2-ethylhexyl methacrylate, 0.733 g of methacrylonitrile, 0.500 g of ethylene glycol dimethacrylate, 2.42 g of sodium dodecyl sulfate, and 135 g of water were mixed, the mixture was stirred for 1 hour to emulsify a monomer, 0.227 g of potassium persulfate was added thereto, nitrogen bubbling was performed for 1 hour, and the solution was held under a temperature condition of 70° C. for 8 hours. Fine particles 13 were obtained by adding methanol to the obtained solution for coagulation. The average particle diameter of fine particles 13 was 63 nm and the Tg thereof was −2.0° C. As a result of $^{13}$C-NMR analysis in regard to the fine particles 13, the molar ratio of the constitutional unit derived from 2-ethylhexyl methacrylate and represented by the formula (2) was 84% by mole, the molar ratio of the constitutional unit derived from methacrylonitrile and represented by the formula (10) was 13% by mole, and the molar ratio of the EGDM constitutional unit was 3% by mole.

Synthesis Example 14

Fine Particles 14

12.0 g of 2,4,6-trimethylheptyl methacrylate. 2.94 g of 2-hydroxyethyl methacrylate, 0.464 g of ethylene glycol dimethacrylate 2.25 g of sodium dodecyl sulfate, and 135 g of water were mixed, the mixture was stirred for 1 hour to emulsify a monomer, 0.211 g of potassium persulfate was added thereto, nitrogen bubbling was performed for 1 hour, and the solution was held under a temperature condition of 70° C. for 8 hours. Fine particles 14 were obtained by adding methanol to the obtained solution for coagulation. The average particle diameter of fine particles 14 was 58 nm and the Tg thereof was −20° C. As a result of $^{13}$C-NMR analysis in regard to the fine particles 14, the molar ratio of the constitutional unit derived from 2,4,6-trimethylheptyl methacrylate and represented by the formula (2) was 68% by mole, the molar ratio of the constitutional unit derived from 2-hydroxyethyl methacrylate and represented by the formula (10) was 29% by mole, and the molar ratio of the EGDM constitutional unit was 3% by mole.

Synthesis Example 15

Fine Particles 15 (Comparative Example)

Fine particles 15 were obtained in the same manner as in Synthesis Example 1 except that ethyl acrylate was used in place of 2,4,6-trimethylheptyl methacrylate used for synthesizing the fine particles 1. The average particle diameter of fine particles was 60 nm and the Tg thereof was −25° C.

Synthesis Example 16

Fine Particles 16 (Comparative Example)

Fine particles 16 were obtained using 15.0 g of methyl methacrylate, 0.891 g of ethylene glycol dimethacrylate, 4.32 g of sodium dodecyl sulfate, 0.405 g of potassium persulfate, 120 g of water, and 13.5 g of ethanol in the same manner as in Synthesis Example 1. The average particle diameter of fine particles 16 was 60 nm and the Tg thereof was 105° C.

Synthesis Example 17

Fine Particles 17 (Comparative Example)

Fine particles 17 were obtained using 15.0 g of styrene, 0.856 g of ethylene glycol dimethacrylate, 4.15 g of sodium dodecyl sulfate, 0.390 g of potassium persulfate, 120 g of water, and 13.5 g of ethanol in the same manner as in Synthesis Example 1. The average particle diameter of fine particles 17 was 60 nm and the Tg thereof was 100° C.

Synthesis Example 18

Polymer 3 (Comparative Example)

30 g of 2,4,6-trimethylheptyl methacrylate, 0.129 g of ethyl 2-bromoisobutyrate, and 0.115 g of N,N,N',N'',N''-pentamethyldiethylene triamine were mixed, and nitrogen bubbling was performed for 1 hour. Thereafter, 0.190 g of copper bromide (I) was added to the reaction solution, and the solution was held at 70° C. for 5 hours. A (meth)acrylate polymer (polymer 3) was obtained by performing reprecipitation purification on methanol of the obtained solution. The Tg of the polymer 3 was −41° C.

[Experiment (1): Evaluation of Rubber Composition]

A compounding ingredient other than sulfur and a vulcanization accelerator was added to a diene rubber component and kneaded using a lab mixer in the first mixing stage according to the formulation (part by mass) listed in Table 1 (discharge temperature: 160° C.). Next, sulfur and a vulcanization accelerator were added to the obtained kneaded material and kneaded in the final mixing stage (discharge temperature: 90° C.), thereby preparing a rubber composition. The details of each component listed in Table 1 are as follows.

- SBR 1: alkoxysilyl group and amino group terminal-modified solution polymerization SBR, Tg: −33° C., "HPR350" (manufactured by JSR CORPORATION)
- BR 1: polybutadiene rubber, "UBEPOL BR150B" (manufactured by UBE INDUSTRIES, LTD.)
- Silica: "NIPSILAQ" (manufactured by TOSOH SILICA CORPORATION) (BET: 205 m²/g)
- Silane coupling agent: bis(3-triethoxysilylpropyl)tetrasulfide, "Si69" (manufactured by Eyonik Industries AG)
- Zinc oxide 1: "Zinc Oxide No. 1" (manufactured by Mitsui Mining & Smelting Co., Ltd.)
- Antioxidant: "NOCRAC 6C" (manufactured by OUCHI SHINKO CHEMICAL INDUSTRIAL CO., LTD.)
- Stearic acid: "LUNAC S-20" (manufactured by Kao Corporation)
- Sulfur 1: "Powdery sulfur 150 mesh for rubber" (manufactured by Hosoi Chemical Industry Co., Ltd.)
- Vulcanization accelerator 1: "NOCCELER CZ" (manufactured by OUCHI SHINKO CHEMICAL INDUSTRIAL CO., LTD.)
- Secondary Vulcanization accelerator: "NOCCELER D" (manufactured by OUCHI SHINKO CHEMICAL INDUSTRIAL CO., LTD.)
- Fine particles 1 to 6, 16, and 17: fine particles synthesized in Synthesis Examples 1 to 6, 16, and 17
- Polymer 1: aromatic aliphatic copolymer-based petroleum resin "PETROTAK 100" (manufactured by TOSOH CORPORATION)
- Polymer 2: liquid styrene-butadiene rubber "KURAPRENE L-SBR820" (manufactured Kuraray Co., Ltd.)
- Polymer 3: polymer synthesized in Synthesis Example 18

Each of the obtained rubber compositions was vulcanized at 160° C. for 20 minutes to prepare each test piece having a predetermined shape, and a dynamic viscoelasticity test was performed on each of the obtained test pieces for measuring tanδ at 0° C. and 60° C. and a storage modulus of elasticity E' at −10° C. and measuring the hardness at normal temperature (23° C.). The measuring methods are as follows.

tanδ at 0° C.: The loss factor tanδ was measured under conditions of a temperature of 0° C. a frequency of 10 Hz, a static strain of 10%, and a dynamic strain of 2% using a Rheospectrometer E4000 (manufactured by UBM Corporation), and an index obtained by setting the value of Comparative Example 1 as 100 was displayed. As the index was larger, tanδ was large and the wet grip performance was excellent.

Tanδ at 60° C.: Tanδ was measured according to the same method as that for tanδ at 0° C. except that the temperature was changed to 60° C. and an index obtained by setting the value of Comparative Example 1 as 100 was displayed. As the index was smaller, heat was unlikely to be generated, the rolling resistance of a tire was small, and the rolling resistance performance (in other words, low fuel consumption) thereof was excellent.

E' at −10° C.: The storage modulus of elasticity E' at −10° C. was measured under the same conditions as those for tanδ at 0° C. except that the temperature was changed to −10° C., and an index obtained by setting the value of Comparative Example 1 as 100 was displayed. As the index was smaller, E' was small and the low temperature performance was excellent.

Hardness at 23° C.: The hardness at a temperature of 23° C. was measured using a durometer type A in conformity with JIS K6253, and an index obtained by setting the value of Comparative Example 1 as 100 was displayed. As the index was larger, the hardness at normal temperature was high.

TABLE 1

| | Comparative Example | | | | | | Example | | | | | |
|---|---|---|---|---|---|---|---|---|---|---|---|---|
| | 1 | 2 | 3 | 4 | 5 | 6 | 1 | 2 | 3 | 4 | 5 | 6 |
| Formulation (part by mass) | | | | | | | | | | | | |
| SBR 1 | 70 | 70 | 70 | 70 | 70 | 70 | 70 | 70 | 70 | 70 | 70 | 70 |
| BR 1 | 30 | 30 | 30 | 30 | 30 | 30 | 30 | 30 | 30 | 30 | 30 | 30 |
| Silica | 70 | 70 | 70 | 70 | 70 | 70 | 70 | 70 | 70 | 70 | 70 | 70 |
| Silane coupling agent | 5.6 | 5.6 | 5.6 | 5.6 | 5.6 | 5.6 | 5.6 | 5.6 | 5.6 | 5.6 | 5.6 | 5.6 |
| Fine particles 1 | — | — | — | — | — | — | 10 | — | — | — | — | — |
| Fine particles 2 | — | — | — | — | — | — | — | 10 | — | — | — | — |
| Fine particles 3 | — | — | — | — | — | — | — | — | 10 | — | — | — |

TABLE 1-continued

|  | Comparative Example | | | | | | Example | | | | | |
| --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 |
| Fine particles 4 | — | — | — | — | — | — | — | — | — | 10 | — | — |
| Fine particles 5 | — | — | — | — | — | — | — | — | — | — | 10 | — |
| Fine particles 6 | — | — | — | — | — | — | — | — | — | — | — | 10 |
| Fine particles 16 | — | 10 | — | — | — | — | — | — | — | — | — | — |
| Fine particles 17 | — | — | 10 | — | — | — | — | — | — | — | — | — |
| Polymer 1 | — | — | — | 10 | — | — | — | — | — | — | — | — |
| Polymer 2 | — | — | — | — | 10 | — | — | — | — | — | — | — |
| Polymer 3 | — | — | — | — | — | 10 | — | — | — | — | — | — |
| Zinc oxide 1 | 2 | 2 | 2 | 2 | 2 | 2 | 2 | 2 | 2 | 2 | 2 | 2 |
| Antioxidant | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 |
| Sulfur 1 | 1.8 | 1.8 | 1.8 | 1.8 | 1.8 | 1.8 | 1.8 | 1.8 | 1.8 | 1.8 | 1.8 | 1.8 |
| Vulcanization accelerator 1 | 1.8 | 1.8 | 1.8 | 1.8 | 1.8 | 1.8 | 1.8 | 1.8 | 1.8 | 1.8 | 1.8 | 1.8 |
| Secondary vulcanizaton accelerator | 1.5 | 1.5 | 1.5 | 1.5 | 1.5 | 1.5 | 1.5 | 1.5 | 1.5 | 1.5 | 1.5 | 1.5 |
| Physical properties (index) | | | | | | | | | | | | |
| Tanδ at 0° C. | 100 | 119 | 110 | 110 | 115 | 118 | 135 | 138 | 136 | 136 | 128 | 134 |
| Tanδ at 60° C. | 100 | 105 | 110 | 105 | 101 | 102 | 98 | 102 | 99 | 100 | 98 | 101 |
| E' at −10° C. | 100 | 136 | 130 | 139 | 98 | 100 | 100 | 102 | 100 | 101 | 98 | 100 |
| Hardness at 23° C. | 100 | 102 | 100 | 92 | 90 | 96 | 102 | 103 | 101 | 102 | 98 | 104 |

The results are as listed in Table 1. In Examples 1 to 6 in which fine particles 1 to 6 formed of the specific (meth)acrylate polymer were blended, the rolling resistance performance was not substantially degraded and the wet grip performance was significantly improved compared to Comparative Example 1 which was the control. Further, the modulus of elasticity at a low temperature was not substantially increased, the low temperature performance was excellent, degradation of hardness at normal temperature was not substantially found, and the operation stability was maintained. On the contrary, in Comparative Example 2 in which fine particles 16 formed of a (meth)acrylate polymer having a high glass transition point were used and Comparative Example 3 in which the fine particles 17 formed of polystyrene were used, the effect of improving the wet grip performance was small, the low temperature performance was significantly impaired, and degradation of the rolling resistance performance was found. In Comparative Example 4 in which a petroleum resin was blended without using fine particles, similar to Comparative Examples 2 and 3, the low temperature performance was greatly degraded and degradation of the rolling resistance performance was found. Further, in Comparative Example 5 in which liquid rubber was blended, degradation of hardness at normal temperature was significant. In addition, in Comparative Example 6 in which a (meth)acrylate polymer which had a low glass transition point and was not in the form of a fine particle was blended, the performance was inferior to those of Examples 1 to 6 from the viewpoint of the balance between the wet grip performance and the hardness at normal temperature.

[Experiment (2): Evaluation of Rubber Compostion]

A rubber composition was prepared in the same manner as in Experiment (1) according to the formulation (part by mass) listed in Tables 2 and 3. The details of each component listed in Tables 2 and 3 are as follows (those which are the same as listed in Table 1 are as described above).

SBR 2: unmodified SBR, "SL563" (manufactured by JSR CORPORATION)

SBR 3: amino group terminal-modified SBR, "#9590" (manufactured by ZEON CORPORATION)

SBR 4: hydroxyl group terminal-modified SBR, "TUFDEN E580" (manufactured by Asahi Kasei Corporation)

SBR 5: carboxyl group terminal-modified SBR "Nipol LX421" (manufactured by ZEON CORPORATION)

Fine particles 15: fine particles obtained according to the method described in Synthesis Example 15

Cross-linked rubber particles: "Nanoprene BM350H" (manufactured by LANXESS AG), styrene-butadiene rubber gel (Tg: −35° C.)

Each of the obtained rubber compositions was vulcanized at 160° C. for 20 minutes to prepare each test piece having a predetermined shape, and a dynamic viscoelasticity test was performed on each of the obtained test pieces for measuring tanδ at 0° C. and 60° C. Further, the tear strength thereof was measured. The results are listed in Tables 2 and 3. The measuring methods are as follows.

Tanδ at 0° C. and tanδ at 60° C.: The values were obtained in the same manner as in Experiment (1). In this case, an index obtained by setting the value of Comparative Example 11 in Table 2 as 100 and an index obtained by setting the value of Comparative Example 15 in Table 3 as 100 were respectively displayed.

Tear strength: The tear strength of each test piece was measured in conformity with JIS K6252, and an index obtained by setting the value of Comparative Example 11 in Table 3 as 100 and an index obtained by setting the value of Comparative Example 16 in Table 2 as 100 were respectively displayed. As the index was larger, the tear resistance was excellent.

TABLE 2

| | Comparative Example | | | | | Example | | | | | | |
|---|---|---|---|---|---|---|---|---|---|---|---|---|
| | 11 | 12 | 13 | 14 | 15 | 11 | 12 | 13 | 14 | 15 | 16 | 17 |
| Formulation (part by mass) | | | | | | | | | | | | |
| SBR 1 (modified) | 70 | 70 | 70 | 70 | 70 | 70 | — | — | — | 70 | 70 | 70 |
| SBR 3 (modified) | — | — | — | — | — | — | 70 | — | — | — | — | — |
| SBR 4 (modified) | — | — | — | — | — | — | — | 70 | — | — | — | — |
| SBR 5 (modified) | — | — | — | — | — | — | — | — | 70 | — | — | — |
| BR 1 | 30 | 30 | 30 | 30 | 30 | 30 | 30 | 30 | 30 | 30 | 30 | 30 |
| Silica | 70 | 70 | 70 | 70 | 70 | 70 | 70 | 70 | 70 | 70 | 70 | 70 |
| Silane coupling agent | 5.6 | 5.6 | 5.6 | 5.6 | 5.6 | 5.6 | 5.6 | 5.6 | 5.6 | 5.6 | 5.6 | 5.6 |
| Fine particles 1 | — | — | — | — | — | 10 | 10 | 10 | 10 | — | — | — |
| Fine particles 2 | — | — | — | — | — | — | — | — | — | 10 | — | — |
| Fine particles 5 | — | — | — | — | — | — | — | — | — | — | 10 | — |
| Fine particles 4 | — | — | — | — | — | — | — | — | — | — | — | 10 |
| Fine particles 15 | — | 10 | — | — | — | — | — | — | — | — | — | — |
| Fine particles 16 | — | — | 10 | — | — | — | — | — | — | — | — | — |
| Cross-linked rubber particles | — | — | — | 10 | — | — | — | — | — | — | — | — |
| Polymer 3 | — | — | — | — | 10 | — | — | — | — | — | — | — |
| Zinc oxide 1 | 2 | 2 | 2 | 2 | 2 | 2 | 2 | 2 | 2 | 2 | 2 | 2 |
| Antioxidant | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 |
| Sulfur 1 | 1.8 | 1.8 | 1.8 | 1.8 | 1.8 | 1.8 | 1.8 | 1.8 | 1.8 | 1.8 | 1.8 | 1.8 |
| Vulcanization acceleralor 1 | 1.8 | 1.8 | 1.8 | 1.8 | 1.8 | 1.8 | 1.8 | 1.8 | 1.8 | 1.8 | 1.8 | 1.8 |
| Secondary vulcanization accelerator | 1.5 | 1.5 | 1.5 | 1.5 | 1.5 | 1.5 | 1.5 | 1.5 | 1.5 | 1.5 | 1.5 | 1.5 |
| Physical properties (index) | | | | | | | | | | | | |
| Tanδ at 0° C. | 100 | 110 | 119 | 115 | 118 | 135 | 134 | 135 | 133 | 138 | 130 | 136 |
| Tanδ at 60° C. | 100 | 106 | 105 | 110 | 102 | 98 | 99 | 100 | 101 | 102 | 96 | 99 |
| Tear strength | 100 | 93 | 90 | 88 | 93 | 105 | 100 | 100 | 102 | 101 | 105 | 102 |

TABLE 3

| | Comparative Example 16 | Example 18 |
|---|---|---|
| Formulation (part by mass) | | |
| SBR 2 (unmodified) | 70 | 70 |
| BR 1 | 30 | 30 |
| Silica | 70 | 70 |
| Silane coupling agent | 5.6 | 5.6 |
| Fine particles 1 | — | 10 |
| Zinc oxide 1 | 2 | 2 |
| Antioxidant | 2 | 2 |
| Stearic acid | 2 | 2 |
| Sulfur 1 | 1.8 | 1.8 |
| Vulcanization accelerator 1 | 1.8 | 1.8 |
| Secondary vulcanization accelerator | 1.5 | 1.5 |
| Physical properties (index) | | |
| Tanδ at 0° C. | 100 | 130 |
| Tanδ at 60° C. | 100 | 102 |
| Tear strength | 100 | 92 |

In the case of blending systems obtained by using unmodified SBR as shown in Table 3, in Example 18 in which the fine particles 1 were blended, the wet grip performance was improved while degradation of the rolling resistance performance was suppressed, but the tearing, performance was degraded compared to Comparative Example 16 which was the control. Meanwhile, in the case of blending systems obtained by using modified SBR as shown in Table 2, in Examples 11 to 17 in which the fine particles 1, 2, 4, and 5 were blended, the tear resistance was maintained or improved while degradation of the rolling resistance performance was suppressed, and the wet grip performance was significantly improved compared to Comparative Example 11 which was the control.

On the contrary, in Comparative Examples 12 and 13 in which the fine particles 15 and 16 respectively formed of an unregulated (meth)acrylate polymer were blended, the effect of improving wet grip performance was small, degradation of the rolling resistance performance was found, and the tear resistance was degraded. Further, in Comparative Example 14 in which cross-linked rubber particles were blended in place of fine particles formed of a (meth)acrylate polymer, the effect of improving the wet grip performance was small, and the rolling resistance performance and the tear resistance were degraded. Moreover, in Comparative Example 15 in which a (meth)acrylate polymer which was not in the form of a fine particle was blended, the effect of improving wet grip performance was small and the tear resistance was degraded.

[Experiment (3): Evaluation of Rubber Composition]

A rubber composition was prepared in the same manner as in Experiment (1) according to the formulation (part by mass) listed in Table 4. The details of each component listed in Table 4 are as follows (those which are the same as listed in Tables 1 to 3 are as described above).

Fine particles 7 to 14: fine particles obtained according to the methods described in Synthesis Examples 7 to 14

Each of the obtained rubber compositions was vulcanized at 160° C. for 20 minutes to prepare each test piece having a predetermined shape, and a dynamic viscoelasticity test was performed on each of the obtained test pieces for measuring tanδ at 0° C. and 60° C. Further, the tear strength thereof was measured. The methods of measuring tanδ at 0° C. and tanδ at 60° C. were the same as those in Experiment (1), and the method of measuring the tear strength was the same as that in Experiment (2). Here, an index obtained by setting the value of Comparative Example 21 as 100 was used in all cases. The results are listed in Table 4.

TABLE 4

| | Comparative Example | | Example | | | | | | | |
|---|---|---|---|---|---|---|---|---|---|---|
| | 21 | 22 | 20 | 21 | 22 | 23 | 24 | 25 | 26 | 27 |
| Formulation (part by mass) | | | | | | | | | | |
| SBR 1 | 70 | 70 | 70 | 70 | 70 | 70 | 70 | 70 | 70 | 70 |
| BR 1 | 30 | 30 | 30 | 30 | 30 | 30 | 30 | 30 | 30 | 30 |
| Silica | 70 | 70 | 70 | 70 | 70 | 70 | 70 | 70 | 70 | 70 |
| Silane coupling agent | 5.6 | 5.6 | 5.6 | 5.6 | 5.6 | 5.6 | 5.6 | 5.6 | 5.6 | 5.6 |
| Fine particles 7 | — | — | 10 | — | — | — | — | — | — | — |
| Fine particles 8 | — | — | — | 10 | — | — | — | — | — | — |
| Fine particles 9 | — | — | — | — | 10 | — | — | — | — | — |
| Fine particles 10 | — | — | — | — | — | 10 | — | — | — | — |
| Fine particles 11 | — | — | — | — | — | — | 10 | — | — | — |
| Fine particles 12 | — | — | — | — | — | — | — | 10 | — | — |
| Fine particles 13 | — | — | — | — | — | — | — | — | 10 | — |
| Fine particles 14 | — | — | — | — | — | — | — | — | — | 10 |
| Cross-linked rubber particles | — | 10 | — | — | — | — | — | — | — | — |
| Zinc oxide 1 | 2 | 2 | 2 | 2 | 2 | 2 | 2 | 2 | 2 | 2 |
| Antioxidant | 2 | 2 | 2 | 2 | 2 | 2 | 2 | 2 | 2 | 2 |
| Stearic acid | 2 | 2 | 2 | 2 | 2 | 2 | 2 | 2 | 2 | 2 |
| Sulfur 1 | 1.8 | 1.8 | 1.8 | 1.8 | 1.8 | 1.8 | 1.8 | 1.8 | 1.8 | 1.8 |
| Vulcanization accelerator 1 | 1.8 | 1.8 | 1.8 | 1.8 | 1.8 | 1.8 | 1.8 | 1.8 | 1.8 | 1.8 |
| Secondary vulcanization accelerator | 1.5 | 1.5 | 1.5 | 1.5 | 1.5 | 1.5 | 1.5 | 1.5 | 1.5 | 1.5 |
| Physical properties (index) | | | | | | | | | | |
| Tanδ at 0° C. | 100 | 115 | 135 | 133 | 132 | 130 | 135 | 130 | 130 | 131 |
| Tanδ at 60° C. | 100 | 110 | 98 | 92 | 93 | 90 | 92 | 91 | 92 | 92 |
| Tear strength | 100 | 88 | 105 | 106 | 108 | 105 | 105 | 104 | 104 | 105 |

As shown in Table 4, in Example 20 in which the fine particles 7 were blended, the tear resistance was maintained or improved while degradation of the rolling resistance performance was suppressed, and the wet grip performance was able to be significantly improved compared to Comparative Example 21 which was the control. In Examples 21 to 27, the rolling resistance performance was able to be improved and the balance between the low fuel consumption and the wet grip performance was able to be improved while the tear resistance was maintained or improved by blending the tune particles 8 to 14 respectively containing a predetermined functional group, compared to Example 20. On the contrary, in Comparative Example 22 in which cross-linked rubber particles were blended, the effect of improving the wet grip performance was small and the rolling resistance performance and the tear resistance were degraded.

[Experiment (4): Preparation and Evaluation of Tire]

A compounding ingredient other than sulfur and a vulcanization accelerator was added to a rubber component and kneaded using a Banbury mixer in the first mixing stage according to the formulation (part by mass) listed in Table 5 (discharge temperature: 160° C.). Next, sulfur and a vulcanization accelerator were added to the obtained kneaded material and kneaded in the final mixing stage (discharge temperature: 90° C.), thereby preparing a rubber composition. The details of each component listed in Table 5 are as follows (those which are the same as listed in Tables 1 to 4 are as described above).

SBR 6: unmodified SBR, Tg: −40° C., "JSR0122" (manufactured by JSR CORPORATION)

SBR 7: unmodified SBR, Tg: −53° C. "JSR1723" (manufactured by JSR CORPORATION)

SBR 8: unmodified SBR, Tg: −4° C., "SE-6529" (manufactured by Sumitomo Chemical Co., Ltd.)

NR: RSS#3

Carbon black 1: "SEAST 3" (manufactured by Tokai Carbon Co., Ltd.) $N_2SA$: 79 $m^2/g$)

Aromatic oil: "PROCESS NC140" (manufactured by JXTG Nippon Oil & Energy Corporation)

Petroleum resin 1: "PETROTACK 90" (manufactured by TOSOH CORPORATION)

Zinc oxide 2: "Zinc oxide No. 3" (manufactured by Mitsui Mining & Smelting Co., Ltd), Wax: "OZOACE0355" (manufactured by NIPPON SEIRO CO., LTD.)

Sulfur 2: "Powdery sulfur" (manufactured by Tsurumi Chemical Industry Co., Ltd.)

Vulcanization accelerator 2: "NOCCELER D" (manufactured by OUCHI SHINKO CHEMICAL INDUSTRIAL CO., LTD.)

Vulcanization accelerator 3: "SOXINOL CZ" (manufactured by Sumitomo Chemicals Co., Ltd.)

Vulcanization molding was performed on each of the obtained rubber compositions using the rubber compositions for tread rubber according to a conventional method to prepare a pneumatic radial tire (tire size: 215/45ZR17). The operation stability and the wet grip performance of the obtained tire were evaluated. The measuring method and the evaluation method are as follows.

Operation stability: Four test tires were installed on an automobile, and sensory evaluation (feeling) of the operation stability was performed by a test driver running the automobile on a dry road surface. An index obtained by setting the value of the operation stability evaluation in Control A1 as 100 was displayed. As the index was larger, the operation stability was excellent.

Wet grip performance: Four test tires were installed on an automobile, and evaluation was performed by a test driver running the automobile on a watered road surface with a water depth of 2 to 3 mm. The fraction coefficient at 100 km/h was measured, and an index obtained by setting the value of Control A1 as 100 was displayed. As the index was larger, the fraction coefficient was high and the wet grip performance was excellent.

mass) listed in Table 6. The details of each component listed in Table 6 are as follows (those which are the same as listed in Tables 1 to 5 are as described above).

Paraffin-based oil: "PROCESS P200" (manufactured by JXTG Nippon Oil & Energy Corporation)

Vulcanization molding was performed on each of the obtained rubber compositions using the rubber compositions for tread rubber according to a conventional method to

TABLE 5

| | Rubber composition No. | | | | | | | | | | | | | | | |
|---|---|---|---|---|---|---|---|---|---|---|---|---|---|---|---|---|
| | A1 | A2 | A3 | A4 | A5 | A6 | A7 | A8 | A9 | A10 | A11 | A12 | A13 | A14 | A15 | A16 |
| Formulation (part by mass) | | | | | | | | | | | | | | | | |
| SBR 6 (Tg: −40) | 70 | 70 | 70 | — | — | 70 | 70 | 70 | 70 | 70 | 70 | — | 70 | 35 | — | — |
| SBR 1 (Tg: −33) | — | — | — | — | — | — | — | — | — | — | — | 70 | — | 35 | — | 50 |
| SBR 7 (Tg: −53) | — | — | — | — | — | — | — | — | — | — | — | — | — | — | 70 | — |
| SBR 8 (Tg: −4) | — | — | — | 70 | 70 | — | — | — | — | — | — | — | — | — | — | — |
| NR | 30 | 30 | 30 | 30 | 30 | 30 | 30 | 30 | 30 | 30 | 30 | 30 | 30 | 30 | 30 | 50 |
| Silica | 90 | 90 | 90 | 90 | 90 | 90 | 90 | 90 | 90 | 90 | 90 | 90 | 60 | 90 | 90 | 90 |
| Carbon black 1 | 5 | 5 | 5 | 5 | 5 | 5 | 5 | 5 | 5 | 5 | 5 | 5 | 40 | 5 | 5 | 5 |
| Aromatic oil | 30 | 25 | 25 | 30 | 30 | 30 | 25 | 15 | 25 | 25 | 25 | 25 | 25 | 30 | 30 | 15 |
| Fine particles 1 | — | — | — | — | 10 | 5 | 10 | 20 | — | — | — | 10 | 10 | 10 | 10 | 20 |
| Fine particles 2 | — | — | — | — | — | — | — | — | 10 | — | — | — | — | — | — | — |
| Fine particles 5 | — | — | — | — | — | — | — | — | — | 10 | — | — | — | — | — | — |
| Fine particles 4 | — | — | — | — | — | — | — | — | — | — | 10 | — | — | — | — | — |
| Petroleum resin 1 | — | 10 | — | — | — | — | — | — | — | — | — | — | — | — | — | — |
| Cross-linked rubber particles | — | — | 10 | — | — | — | — | — | — | — | — | — | — | — | — | — |
| Zinc oxide 2 | 3 | 3 | 3 | 3 | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 | 2 | 2 | 2 | 2 |
| Antioxidant | 2 | 2 | 2 | 2 | 2 | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 | 2 | 2 | 2 | 2 | 2 |
| Silane coupling agent | 7 | 7 | 7 | 7 | 7 | 7 | 7 | 7 | 7 | 7 | 7 | 7 | 5 | 7 | 7 | 7 |
| Sulfur 2 | 2 | 2 | 2 | 2 | 2 | 2 | 2 | 2 | 2 | 2 | 2 | 2 | 2 | 2 | 2 | 2 |
| Vulcanization accelerator 2 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Vulcanization accelerator 3 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Evaluation (index) | | | | | | | | | | | | | | | | |
| Operation stability | 100 | 94 | 100 | 97 | 99 | 101 | 101 | 103 | 103 | 101 | 103 | 100 | 101 | 100 | 100 | 101 |
| Wet grip performance | 100 | 119 | 103 | 103 | 115 | 107 | 119 | 127 | 115 | 119 | 115 | 109 | 112 | 112 | 107 | 122 |

The results are as listed in Table 5. In A2 in which a petroleum resin was blended, the wet grip performance was improved, but the operation stability was degraded compared to Control A1. Further, in A3 in which cross-linked rubber particles were blended, the effect of improving the wet grip performance was small. In A4 in which SBR having a high Tg was used, the effect of improving the wet grip performance was small and the operation stability was degraded compared to A1. In A5, the fine particles 1 formed of a specific (meth)acrylate polymer were blended, but SBR having a high Tg, was used in combination, and thus the operation stability was degraded compared to A1. On the contrary, in A6 to A16 in which fine particles respectively formed of a specific (meth)acrylate poly-met were blended with a rubber component formed of SBR and NR respectively having a specific Tg, the wet grip performance was able to be significantly improved while the operation stability was maintained.

[Experiment (5): Preparation and Evaluation of Tire]

A rubber composition was prepared in the same manner as in Experiment (4) according to the formulation (part by prepare a pneumatic radial tire (tire size: 215/45ZR17). The snow performance and the wet grip performance of the obtained tire were evaluated. The measuring method and the evaluation method are as follows.

Snow performance: Four test tires were installed on an automobile, the automobile was driven on a snow road surface at 60 km/h and operated in an antilock brake system (ABS), and the braking distance at the time decelerating from 60 km/h to 20 km/h was measured (average number n: 10). For the reciprocal number of the breaking distance, an index obtained by setting the value of Control B1 as 100 was displayed. As the index was larger, the braking distance was short and snow braking performance was excellent.

Wet grip performance: The evaluation was performed in the same manner as in Experiment (4). Here, an index obtained by setting the value of Control B1 as 100 was displayed in Table 6.

TABLE 6

| | Rubber composition No. | | | | | | | | | | | | | | | | |
|---|---|---|---|---|---|---|---|---|---|---|---|---|---|---|---|---|---|
| | B1 | B2 | B3 | B4 | B5 | B6 | B7 | B8 | B9 | B10 | B11 | B12 | B13 | B14 | B15 | B16 | B17 |
| Formulation (part by mass) | | | | | | | | | | | | | | | | | |
| SBR 1 (Tg: −33) | 50 | 50 | 50 | — | — | 50 | 50 | 50 | 50 | 50 | 50 | 50 | 50 | 60 | — | 30 | 50 |
| SBR 7 (Tg: −53) | — | — | — | — | — | — | — | — | — | — | — | — | — | — | 50 | — | — |
| SBR 8 (Tg: −4) | — | — | — | 50 | 50 | — | — | — | — | — | — | — | — | — | — | — | — |
| BR 1 | 40 | 40 | 40 | 40 | 40 | 40 | 40 | 40 | 40 | 40 | 40 | 40 | 40 | 40 | 40 | 50 | 50 |
| NR | 10 | 10 | 10 | 10 | 10 | 10 | 10 | 10 | 10 | 10 | 10 | 10 | 10 | — | 10 | 20 | — |
| Silica | 70 | 70 | 70 | 70 | 70 | 70 | 70 | 75 | 70 | 70 | 70 | 40 | — | 70 | 70 | 70 | 70 |
| Carbon black 1 | 5 | 5 | 5 | 5 | 5 | 5 | 5 | 5 | 5 | 5 | 5 | 40 | 85 | 5 | 5 | 5 | 5 |
| Paraffin-based oil | 15 | 15 | 15 | 15 | 15 | 15 | 15 | 15 | 15 | 15 | 15 | 15 | 15 | 15 | 15 | 15 | 15 |
| Fine particles 1 | — | — | — | — | 10 | 5 | 10 | 20 | — | — | — | 10 | 10 | 10 | 10 | 20 | 20 |
| Fine particles 2 | — | — | — | — | — | — | — | — | 10 | — | — | — | — | — | — | — | — |
| Fine particles 5 | — | — | — | — | — | — | — | — | — | 10 | — | — | — | — | — | — | — |
| Fine particles 4 | — | — | — | — | — | — | — | — | — | — | 10 | — | — | — | — | — | — |
| Petroleum resin 1 | — | 10 | — | — | — | — | — | — | — | — | — | — | — | — | — | — | — |
| Cross-linked rubber particles | — | — | 10 | — | — | — | — | — | — | — | — | — | — | — | — | — | — |
| Zinc oxide 2 | 3 | 3 | 3 | 3 | 3 | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 | 2 | 2 | 2 | 2 | 2 |
| Antioxidant | 3 | 3 | 3 | 3 | 3 | 3 | 3 | 3 | 3 | 3 | 3 | 3 | 3 | 3 | 3 | 3 | 3 |
| Wax | 2 | 2 | 2 | 2 | 2 | 2 | 2 | 2 | 2 | 2 | 2 | 2 | 2 | 2 | 2 | 2 | 2 |
| Silane coupling agent | 6 | 6 | 6 | 6 | 6 | 6 | 6 | 6 | 6 | 6 | 6 | 3 | — | 6 | 6 | 6 | 6 |
| Sulfur 2 | 2 | 2 | 2 | 2 | 2 | 2 | 2 | 2 | 2 | 2 | 2 | 2 | 2 | 2 | 2 | 2 | 2 |
| Vulcanization accelerator 2 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Vulcanization accelerator 3 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Evaluation (index) | | | | | | | | | | | | | | | | | |
| Snow performance | 100 | 94 | 100 | 94 | 96 | 99 | 101 | 100 | 103 | 101 | 103 | 99 | 99 | 100 | 104 | 105 | 104 |
| Wet grip performance | 100 | 114 | 102 | 104 | 111 | 111 | 124 | 131 | 127 | 120 | 122 | 117 | 117 | 112 | 116 | 115 | 120 |

The results are as listed in Table 6. In B2 in which a petroleum resin was blended, the wet grip performance was improved, but the snow performance was degraded compared to Control B1. Further, in B3 in which cross-linked rubber particles were blended, the effect of improving the wet grip performance was small. In B4 in which SBR having a high Tg was used, the effect of improving the wet grip performance was small and the snow performance was degraded compared to B1. In B5, the fine particles 1 formed of a specific (meth)acrylate polymer were blended, but SBR having a high Tg was used in combination, and thus the snow performance was degraded compared to B1. On the contrary, in B6 to B17 in which fine particles respectively formed of a specific (meth)acrylate polymer were blended with a rubber component formed of SBR and BR respectively having a specific Tg, the wet grip performance was able to be significantly improved while degradation of the snow performance was suppressed.

[Experiment (6): Preparation and Evaluation of Tire]

A rubber composition was prepared in the same manner as in Experiment (4) according to the formulation (part by mass) listed in Table 7. The details of each component listed in Table 7 are as follows (those which are the same as listed in Tables 1 to 6 are as described above).

BR2: "BR01" (manufactured by JSR CORPORATION) (content of high cis BR and cis-1,4 bond: 95%)

Carbon black 2: "SEAST KH" (manufactured by Tokai Carbon Co., Ltd.)

Vulcanization molding was performed on each of the obtained rubber compositions using the rubber compositions for tread rubber according to a conventional method to prepare a pneumatic radial tire (tire size: 195/65R15). The ice performance and the wet grip performance of the obtained tire were evaluated. The measuring method and the evaluation method are as follows.

Ice performance: Four test tires were installed on a 2000 cc 4WD automobile, the automobile was driven on an ice road (temperature: −3±3° C.) at 40 km/h and operated in an ABS, and the braking distance was measured (average number n: 10). For the reciprocal number the braking distance, an index obtained by setting the value of Control C1 as 100 was displayed. As the index as larger, the braking distance was short and braking performance on the ice road surface was excellent.

Wet grip performance: The evaluation was performed in the same manner as in Experiment (4). Here, an index obtained by setting the value of Control C1 as 100 was displayed in Table 7.

TABLE 7

| | Rubber composition No. | | | | | | | | | | | | | |
|---|---|---|---|---|---|---|---|---|---|---|---|---|---|---|
| | C1 | C2 | C3 | C4 | C5 | C6 | C7 | C8 | C9 | C10 | C11 | C12 | C13 | C14 |
| Formulation (part by mass) | | | | | | | | | | | | | | |
| BR 2 | 50 | 50 | 50 | 50 | 60 | 50 | 50 | 50 | 50 | 50 | 50 | 50 | 50 | 60 |
| NR | 50 | 50 | 50 | 50 | 40 | 50 | 50 | 50 | 50 | 50 | 50 | 50 | 50 | 40 |
| Silica | 25 | 25 | 25 | 25 | 25 | 25 | 25 | 25 | 25 | 25 | 25 | 20 | 30 | 25 |
| Carbon black 2 | 35 | 35 | 35 | 35 | 35 | 35 | 35 | 35 | 35 | 35 | 35 | 30 | 40 | 35 |
| Paraffin-based oil | 25 | 25 | 25 | — | 25 | 25 | 25 | 25 | 25 | 25 | 25 | 15 | 35 | 25 |
| Aromatic oil | — | — | — | 25 | — | — | — | — | — | — | — | — | — | — |
| Fine particles 1 | — | — | — | 10 | — | 5 | 10 | 20 | — | — | — | 10 | 10 | 10 |
| Fine particles 2 | — | — | — | — | — | — | — | — | 10 | — | — | — | — | — |
| Fine particles 5 | — | — | — | — | — | — | — | — | — | 10 | — | — | — | — |
| Fine particles 4 | — | — | — | — | — | — | — | — | — | — | 10 | — | — | — |
| Petroleum resin 1 | — | 10 | — | — | — | — | — | — | — | — | — | — | — | — |
| Cross-linked rubber particles | — | — | 10 | — | — | — | — | — | — | — | — | — | — | — |
| Zinc oxide 2 | 3 | 3 | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 | 2 | 2 |
| Antioxidant | 2 | 2 | 2 | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 | 2 | 2 | 2 |
| Silane coupling agent | 2 | 2 | 2 | 2 | 2 | 2 | 2 | 2 | 2 | 2 | 2 | 2 | 2 | 2 |
| Sulfur 2 | 2 | 2 | 2 | 2 | 2 | 2 | 2 | 2 | 2 | 2 | 2 | 2 | 2 | 2 |
| Vulcanization accelerator 3 | 1.5 | 1.5 | 1.5 | 1.5 | 1.5 | 1.5 | 1.5 | 1.5 | 1.5 | 1.5 | 1.5 | 1.5 | 1.5 | 1.5 |
| Evaluation (index) | | | | | | | | | | | | | | |
| Ice performance | 100 | 89 | 101 | 95 | 103 | 103 | 105 | 104 | 103 | 104 | 106 | 105 | 104 | 108 |
| Wet grip performance | 100 | 116 | 105 | 113 | 97 | 109 | 119 | 124 | 117 | 118 | 113 | 116 | 121 | 116 |

The results are as listed in Table 7. In C2 in which a petroleum resin was blended, the wet grip performance was improved, but the ice performance was degraded compared to Control C1. Further, in C3 in which cross-linked rubber particles were blended, the effect of improving the wet grip performance was small. In C4, the fine particles 1 formed of a specific (meth)acrylate polymer were blended, but aromatic oil was used in combination, and thus the ice performance was degraded compared to C1. On the contrary, in C6 to C14 in which fine particles respectively formed of a specific (meth)acrylate polymer were combined with paraffin-based oil, the wet grip performance was able to be significantly improved while the ice performance was maintained or improved.

[Experiment (7): Preparation and Evaluation of Tire]

A rubber composition was prepared in the same manner as in Experiment (4) according to the formulation (part by mass) listed in Table 8. The details of each component listed in Table 8 are as follows (those which are the same as listed in Tables 1 to 7 are as described above).

SBR 9: "JSR0202" (manufactured by JSR CORPORATION)

Carbon black 3: "DIABLACK-UX10" (manufactured by Mitsubishi Chemical Corporation) ($N_2SA$: 190 $m^2/g$)

Carbon black 4: "SEAST 9" (manufactured by Tokai Carbon Co., Ltd.) ($N_2SA$: 142 $m^2/g$)

Carbon black 5: "DIABLACK N339" (manufactured by Mitsubishi Chemical Corporation ($N_2SA$: 91 $m^2/g$)

Petroleum resin 2: aliphatic petroleum resin, "QUINTONE M100" (manufactured by ZEON CORPORATION) (softening point: 95° C.)

The processability of each of the obtained rubber compositions in an unvulcanized state was evaluated. Further, test pieces in a dumbbell shape No. 3 obtained by vulcanization at 160° C. for 30 minutes were prepared, and the operation stability was evaluated. Vulcanization molding was performed on each of the obtained rubber compositions using the rubber compositions for tread rubber according to a conventional method to prepare a tire for motor sports (tire size: 31/71-18). The wet grip performance of the obtained tire was evaluated. The measuring method and the evaluation method are as follows.

Processability: The adhesiveness a unvulcanized rubber to a roll was sensory evaluated in 5 stages of 1 to 5. As the number was closer to 1, the adhesiveness was high and the workability (processability) was degraded.

Operation stability: The modulus at 100% elongation (100% tensile stress: S100) was measured under a temperature condition of 100° C. using an automatic tensile tester (manufactured by UESHIMA SEISAKUSHO CO., LTD.) in conformity with JIS K6251, and an index obtained by setting the value of Control D1 as 100 was displayed. The modulus at 100° C. is an indicator of the operation stability in a tire for motor sports. As the index was larger, S100 was high and the operation stability was excellent.

Wet grip performance: The evaluation was performed in the same manner as in Experiment (4). Here, an index obtained by setting the value of Control D1 as 100 was displayed in Table 8.

TABLE 8

| | Rubber composition No. | | | | | | | | | | | | | |
|---|---|---|---|---|---|---|---|---|---|---|---|---|---|---|
| | D1 | D2 | D3 | D4 | D5 | D6 | D7 | D8 | D9 | D10 | D11 | D12 | D13 | D14 |
| Formulation (part by mass) | | | | | | | | | | | | | | |
| SBR 9 | 100 | 100 | 100 | 100 | 100 | 100 | 100 | 100 | 100 | 100 | 100 | 100 | 100 | 100 |
| Carbon black 3 | 80 | 80 | — | 80 | 80 | 80 | 80 | 80 | 80 | 60 | 100 | 90 | 70 | — |
| Carbon black 4 | — | — | — | — | — | — | — | — | — | — | — | — | — | 120 |
| Carbon black 5 | — | — | 80 | — | — | — | — | — | — | — | — | — | — | — |
| Silica | 20 | 20 | 20 | 20 | 20 | 20 | 20 | 20 | 20 | 40 | — | 20 | 20 | 10 |
| Aromatic oil | 45 | 45 | 30 | 45 | 45 | 45 | 45 | 45 | 45 | 20 | 50 | 50 | 20 | 45 |
| Petroleum resin 2 | 45 | 45 | 45 | 45 | 45 | 45 | 45 | 45 | 45 | 45 | 40 | 30 | 60 | 20 |
| Fine particles 1 | — | — | 10 | 5 | 10 | 20 | — | — | — | 10 | 10 | 10 | 10 | 10 |
| Fine particles 2 | — | — | — | — | — | — | 10 | — | — | — | — | — | — | — |
| Fine particles 5 | — | — | — | — | — | — | — | 10 | — | — | — | — | — | — |
| Fine particles 4 | — | — | — | — | — | — | — | — | 10 | — | — | — | — | — |
| Cross-linked lubber particles | — | 10 | — | — | — | — | — | — | — | — | — | — | — | — |
| Zinc oxide 2 | 3 | 3 | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 | 2 | 2 |
| Antioxidant | 2 | 2 | 2 | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 | 2 | 2 | 2 |
| Silane coupling agent | 1.5 | 1.5 | 1.5 | 1.5 | 1.5 | 1.5 | 1.5 | 1.5 | 1.5 | 3.2 | — | 1.5 | 1.5 | 0.8 |
| Sulfur 2 | 2 | 2 | 2 | 2 | 2 | 2 | 2 | 2 | 2 | 2 | 2 | 2 | 2 | 2 |
| Vulcanization accelerator 3 | 2 | 2 | 2 | 2 | 2 | 2 | 2 | 2 | 2 | 2 | 2 | 2 | 2 | 2 |
| Evaluation (index) | | | | | | | | | | | | | | |
| Processability | 1 | 2 | 5 | 3 | 4 | 4 | 4 | 3 | 3 | 3 | 4 | 3 | 4 | 4 |
| Operation stability | 100 | 96 | 99 | 101 | 103 | 102 | 106 | 103 | 104 | 105 | 107 | 103 | 102 | 103 |
| Wet grip performance | 100 | 105 | 95 | 105 | 111 | 118 | 110 | 112 | 116 | 110 | 120 | 108 | 114 | 113 |

The results are as listed in Table 8. In D2 in which cross-linked rubber particles were blended, the effect of improving the processability was small and the operation stability was impaired compared to Control D 1 . In D3, the fine particles 1 formed of a specific (meth)acrylate polymer were blended, but carbon black having a small particle diameter was not used, and thus the operation stability and the wet grip performance were degraded compared to D1. On the contrary, in D4 to D14 in which fine particles respectively formed of a specific (meth)acrylate polymer were combined with carbon black having a small particle diameter, the wet grip performance and the processability were able to be improved while the operation stability was maintained or improved.

Synthesis Example E1

Fine Particles E1

15.0 g of β-myrcene (manufactured by Tokyo Chemical Industry Co., Ltd.), 0.655 g of ethylene glycol dimethacrylate, 3.18 g of sodium dodecyl sulfate, and 135 g of water were mixed, the mixture was stirred for 1 hour to emulsify a monomer, 0.298 g of potassium persulfate was added thereto, nitrogen bubbling was performed for 1 hour, and the solution was held under a temperature condition of 70° C. for 24 hours. 12.0 g of fine particles E1 (polymerization conversion ratio (production amount/charge amount): 77%) were obtained by adding methanol to the obtained solution for coagulation. The average particle diameter of fine particles E1 was 30 nm and the Tg thereof was −65° C.

In regard to the fine particles E1, as a result of analyzing the chemical structure of the polymer based on $^{13}$C-NMR, the polymer had constitutional units respectively represented by the formulae (4), (11), and (12) (in the formulae, $R^{11}$, $R^{12}$, $R^{14}$, $R^{15}$, and $R^{16}$ represent a hydrogen atom, and $R^{13}$ represents a 4-methyl-3-pentenyl group) and an EGDM constitutional unit, and the molar ratio of the constitutional unit represented by the formula (4) was 72% by mole, the molar ratio of the constitutional unit represented by the formula (11) was 6.0% by mole, the molar ratio of the constitutional unit represented by the formula (12) was 19% by mole, and the molar ratio of the EGDM constitutional unit was 3.0% by mole.

Synthesis Example E2

Fine Particles E2

13.0 g of β-myrcene, 2.39 g of methyl methacrylate, 0.709 g of ethylene glycol dimethacrylate, 3.44 g of sodium dodecyl sulfate, and 135 g of water were mixed (the molar ratio of β-myrcene/methyl methacrylate was 80/20), the mixture was stirred for 1 hour to emulsify a monomer, 0.322 g of potassium persulfate was added thereto, nitrogen bubbling was performed for 1 hour, and the solution was held under a temperature condition of 70° C. for 24 hours. 14.0 g of fine particles E2 (Polymerization conversion ratio: 87%) were obtained by adding methanol to the obtained solution for coagulation. The average particle diameter of fine particles E2 was 30 nm and the Tg thereof was −30° C.

In regard to the fine particles E2, as a result of analyzing the chemical structure performed in the same manner as that for the fine particles 1, the molar ratio of the constitutional unit represented by the formula (4) was 60% by mole, the molar ratio of the constitutional unit represented by the formula (11) was 5.0% by mole, the molar ratio of the constitutional unit represented by the formula (12) was 16% by mole, the molar ratio of the constitutional unit represented by the formula (5) was 16% by mole (in the formulae, both of $R^{17}$ and $R^{18}$ represent a methyl group), and the molar ratio of the EGDM constitutional unit was 3.0% by mole.

Synthesis Example E3

Fine Particles E3

14.5 g of fine particles E3 (polymerization conversion ratio: 88%) were obtained using 9.00 g of β-myrcene, 6.61 g of methyl methacrylate (here, the molar ratio of β-myrcene/methyl methacrylate was 50/50), 0.79 g of ethylene glycol dimethacrylate, 3.81 g of sodium dodecyl sulfate, 0.357 g of potassium persulfate, and 150 g of water in the same manner as in Synthesis Example E2. The average particle diameter of fine particles E3 was 30 nm and the Tg thereof was −5.0° C.

In regard to the fine particles E3, as a result of analyzing the chemical structure performed in the same maimer as that for the fine particles E1 the molar ratio of the constitutional unit represented by the formula (4) was 37% by mole, the molar ratio of the constitutional unit represented by the formula (11) was 2.0% by mole, the molar ratio of the constitutional unit represented by the formula (12) was 8.0% by mole, the molar ratio of the constitutional unit represented by the formula (5) was 50% by mole, and the molar ratio of the EGDM constitutional unit was 3.0% by mole.

Synthesis Example E4

Fine Particles E4

14.0 g of fine particles E4 (polymerization conversion ratio: 87%) were obtained in the same manner as in Synthesis Example E2 except that 13.0 g of β-ocimene (manufactured by Sigma-Aldrich Corporation) was used in place of 13.0 g of β-myrcene used for synthesis of the fine particles E2 (the molar ratio of β-ocimene/methyl methacrylate was 80/20). The average particle diameter of fine particles E4 was 28 nm and the Tg thereof was −28° C.

In regard to the fine particles E4, as a result of analyzing the chemical structure in the same manner as that for the fine particles E1, the polymer had constitutional units respectively represented by the formulae (4), (11), and (12) (in the formulae, one of $R^{11}$ and $R^{12}$ represents a hydrogen atom and the other represents a 3-methyl-2-butenyl group, $R^{13}$ represents a methyl group, and $R^{14}$, $R^{15}$, and $R^{16}$ represent a hydrogen atom), a constitutional unit represented by the formula (5), and an EGDM constitutional unit, and the molar ratio of the constitutional unit represented by the formula (4) was 60% by mole, the molar ratio of the constitutional unit represented by the formula (11) was 6.0% by mole, the molar ratio of the constitutional unit represented by the formula (12) was 16% by mole, the molar ratio of the constitutional unit represented by the formula (5) was 15% by mole, and the molar ratio of the EGDM constitutional unit was 3.0% by mole.

Synthesis Example E5

Fine Particles E5

13.6 g of fine particles E5 (polymerization conversion ratio: 84%) were obtained using 13.0 g of β-myrcene, 2.48 g of styrene (here, the molar ratio of β-myrcene/styrene was 80/20), 0.71 g of ethylene glycol dimethacrylate, 3.44 g of sodium dodecyl sulfate, 0.32 g of potassium persulfate and 150 g of water in the same manner as in Synthesis Example E2. The average particle diameter of fine particles E5 was 28 nm and the Tg thereof was −30° C.

In regard to the fine particles E5, as a result of analyzing the chemical structure performed in the same manner as that for the fine particles E1, the molar ratio of the constitutional unit represented by the formula (4) was 60% by mole, the molar ratio of the constitutional unit represented by the formula (11) was 5.0% by mole, the molar ratio of the constitutional unit represented by the formula (12) was 16% by mole, the molar ratio of the constitutional unit represented by the formula (6) was 16% by mole (in the formulae, both of $R^{19}$ and $R^{20}$ represent a hydrogen atom), and the molar ratio of the EGDM constitutional unit was 3.0% by mole.

Synthesis Example E6

Fine Particles E6

14.0 g of fine particles E6 (polymerization conversion ratio: 86%) were obtained using 12.0 g of β-myrcene, 3.53 g of 4-tert butyl styrene (here, the molar ratio of β-myrcene/styrene was 80/20), 0.655 g of ethylene glycol dimethacrylate, 3.18 g of sodium dodecyl sulfate, 0.298 g of potassium persulfate, and 150 g of water in the same manner as in Synthesis Example E2. The average particle diameter of fine particles E6 was 28 nm and the Tg thereof was −25° C.

In regard to the fine particles E6, as a result of analyzing the chemical structure performed in the same manner as that for the fine particles E1, the molar ratio of the constitutional unit represented by the formula (4) was 58% by mole, the molar ratio of the constitutional unit represented by the formula (11) was 5.0% by mole, the molar ratio of the constitutional unit represented by the formula (12) was 18% by mole, the molar ratio of the constitutional unit represented by the formula (6) was 16% by mole (in the formulae, $R^{19}$ represents a hydrogen atom and $R^{20}$ represents a tert-butyl group), and the molar ratio of the EGDM constitutional unit was 3.0% by mole.

Synthesis Example E7

Fine Particles E7

13.0 g of β-myrcene, 1.19 g of methyl methacrylate, 1.91 g of 4-tert-butyl styrene, 0.709 g of ethylene glycol dimethacrylate, 3.44 g of sodium dodecyl sulfate, and 135 g of water were mixed (the molar ratio of β-myrcene/methyl methacrylate/4-tert-butyl styrene was 80/10/10), the mixture was stirred for 1 hour to emulsify a monomer, 0.322 g of potassium persulfate was added thereto, nitrogen bubbling was performed for 1 hour, and the solution was held under a temperature condition of 70° C. for 24 hours. 14.5 g of fine particles E7 (polymerization conversion ratio: 86%) were obtained by adding methanol to the obtained solution for coagulation. The average particle diameter of fine particles E7 was 32 nm and the Tg thereof was −28° C.

In regard to the fine particles E7, as a result of analyzing the chemical structure performed in the same manner as that for the fine particles E1 the molar ratio of the constitutional unit represented by the formula (4) was 60% by mole, the molar ratio of the constitutional unit represented by the formula (11) was 5.0% by mole, the molar ratio of the constitutional unit represented by the formula (12) was 16% by mole, the molar ratio of the constitutional unit represented by the formula (5) was 8.0% by mole, the molar ratio of the constitutional unit represented by the formula (6) was 8.0% by mole, and the molar ratio of the EGDM constitutional unit was 3.0% by mole.

Synthesis Example E8

Fine Particles E8

13.8 g of fine particles E8 (polymerization conversion ratio: 84%) were obtained using 8.0 g of β-myrcene, 2.94 g of methyl methacrylate, 4.71 g 4-test butyl styrene (here, the molar ratio of β-myrcene/methyl methacrylate/styrene was 50/25/25), 0.698 g of ethylene glycol dimethacrylate, 3.39 g of sodium dodecyl sulfate, 0.318 g of potassium persulfate, and 150 g of water in the same manner as in Synthesis Example E7. The average particle diameter of fine particles E8 was 30 nm and the Tg thereof was 0° C.

In regard to the fine particles E8, as a result of analyzing the chemical structure performed in the same manner as that for the fine particles E1, the molar ratio of the constitutional unit represented by the formula (4) was 42% by mole, the molar ratio of the constitutional unit represented by the formula (11) was 4.0% by mole, the molar ratio of the constitutional unit represented by the formula (12) was 11% by mole, the molar ratio of the constitutional unit represented by the formula (5) was 20% by mole, the molar ratio of the constitutional unit represented by the formula (6) was 20% by mole, and the molar ratio of the EGDM constitutional unit was 3.0% by mole.

Synthesis Example E9

Fine Particles E9

14.5 g of fine particles E9 (polymerization conversion ratio: 94%) were obtained in the same manner as in Synthesis Example E1 except that 0.430 g of divinylbenzene was used in place of 0.655 g of ethylene glycol dimethacrylate used for synthesis of the fine particles E1. The average particle diameter of fine particles E9 was 28 nm and the Tg thereof was −64° C.

In regard to the fine particles E9, as a result of analyzing the chemical structure in the same manner as that for the fine particles E1, the molar ratio of the constitutional unit represented by the formula (4) was 72% by mole, the molar ratio of the constitutional unit represented by the formula (11) was 5.0% by mole, the molar ratio of the constitutional unit represented by the formula (12) was 20% by mole, and the molar ratio of the constitutional unit derived from divinylbenzene was 3.0% by mole.

Synthesis Example E10

Fine Particles E10 (Comparative Example)

11.0 g of isoprene, 4.20 g of styrene, 1.20 g of ethylene glycol dimethacrylate, 5.82 g of sodium dodecyl sulfate, and 135 g of water were mixed, the mixture was stirred for 1 hour to emulsify a monomer, 0.546 g of potassium persulfate was added thereto, nitrogen bubbling was performed for 1 hour, and the solution was held under a temperature condition of 70° C. for 24 hours. 13.5 g of fine particles E10 were obtained by adding methanol to the obtained solution for coagulation. The average particle diameter of fine particles E10 was 30 nm and the Tg thereof was −35° C.

[Experiment (8): Evaluation of Rubber Compositio]

A rubber composition was prepared in the same manner as in Experiment (1) according to the formulation (part by mass) listed in Table 9. The details of each component listed in Table 9 are as follows (those which are the same as listed in Tables 1 to 8 are as described above).

Fine particles E1 to E10: fine particles synthesized in Synthesis Examples E1 to E10

Each of the obtained rubber compositions was vulcanized at 160° C. for 20 minutes to prepare each test piece having a predetermined shape, and a dynamic viscoelasticity test was performed on each of the obtained test pieces for measuring tanδ at 0° C. and 60° C. and a storage modulus of elasticity E' at −10° C. and measuring the hardness at normal temperature (23° C.). These measuring methods were the same as those in Experiment (1). Here, an index obtained by setting the value of Comparative Example 31 as 100 was used in all cases. The results are listed in Table 9.

TABLE 9

| | Comparative Example | | | | Example | | | | | | | | |
|---|---|---|---|---|---|---|---|---|---|---|---|---|---|
| | 31 | 32 | 33 | 34 | 31 | 32 | 33 | 34 | 35 | 36 | 37 | 38 | 39 |
| Formulation (part by mass) | | | | | | | | | | | | | |
| SBR 1 | 70 | 70 | 70 | 70 | 70 | 70 | 70 | 70 | 70 | 70 | 70 | 70 | 70 |
| BR 1 | 30 | 30 | 30 | 30 | 30 | 30 | 30 | 30 | 30 | 30 | 30 | 30 | 30 |
| Silica | 70 | 70 | 70 | 70 | 70 | 70 | 70 | 70 | 70 | 70 | 70 | 70 | 70 |
| Silane coupling agent | 5.6 | 5.6 | 5.6 | 5.6 | 5.6 | 5.6 | 5.6 | 5.6 | 5.6 | 5.6 | 5.6 | 5.6 | 5.6 |
| Fine particles E1 | | | | | 10 | | | | | | | | |
| Fine particles E2 | | | | | | 10 | | | | | | | |
| Fine particles E3 | | | | | | | 10 | | | | | | |
| Fine particles E4 | | | | | | | | 10 | | | | | |
| Fine particles E5 | | | | | | | | | 10 | | | | |
| Fine particles E6 | | | | | | | | | | 10 | | | |
| Fine particles E7 | | | | | | | | | | | 10 | | |
| Fine particles E8 | | | | | | | | | | | | 10 | |
| Fine particles E9 | | | | | | | | | | | | | 10 |
| Fine particles E10 | | 10 | | | | | | | | | | | |
| Polymer 1 | | | 10 | | | | | | | | | | |
| Polymer 2 | | | | 10 | | | | | | | | | |
| Zinc oxide 1 | 2 | 2 | 2 | 2 | 2 | 2 | 2 | 2 | 2 | 2 | 2 | 2 | 2 |
| Antioxidant | 2 | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 | 2 |
| Sulfur 1 | 1.8 | 1.8 | 1.8 | 1.8 | 1.8 | 1.8 | 1.8 | 1.8 | 1.8 | 1.8 | 1.8 | 1.8 | 1.8 |

TABLE 9-continued

| | Comparative Example | | | | Example | | | | | | | | |
|---|---|---|---|---|---|---|---|---|---|---|---|---|---|
| | 31 | 32 | 33 | 34 | 31 | 32 | 33 | 34 | 35 | 36 | 37 | 38 | 39 |
| Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 |
| Secondary vulcanization accelerator | 1.5 | 1.5 | 1.5 | 1.5 | 1.5 | 1.5 | 1.5 | 1.5 | 1.5 | 1.5 | 1.5 | 1.5 | 1.5 |
| Physical properties (index) | | | | | | | | | | | | | |
| Tanδ at 0° C. | 100 | 112 | 110 | 115 | 120 | 122 | 125 | 118 | 120 | 119 | 125 | 130 | 122 |
| Tanδ at 60° C. | 100 | 115 | 105 | 101 | 98 | 102 | 101 | 98 | 100 | 98 | 100 | 102 | 100 |
| E' at −10° C. | 100 | 110 | 139 | 98 | 92 | 94 | 95 | 92 | 95 | 95 | 95 | 96 | 93 |
| Hardness at 23° C. | 100 | 98 | 92 | 90 | 100 | 102 | 101 | 100 | 100 | 99 | 102 | 102 | 101 |

The results are as listed in Table 9. In Examples 31 to 39 in which fine particles E1 to E9 formed of the specific polymer were blended, the rolling resistance performance was not substantially degraded and the wet grip performance was significantly improved compared to Comparative Example 31 which was the control. Further, the modulus of elasticity at a low temperature was reduced, and the low temperature performance was excellent. In addition, degradation of hardness at normal temperature was not substantially found, and the operation stability was maintained.

On the contrary, in Comparative Example 32 in which fine particles E10 formed of an isoprene-based polymer were blended, the effect of improving the wet grip performance was small, degradation of the rolling resistance performance was found, and the low temperature performance was also impaired. In Comparative Example 33 in which a petroleum resin was blended without using fine particles, the effect of improving the wet grip performance was small, the low temperature performance was significantly degraded, and degradation of the hardness at normal temperature was found. Further, in Comparative Example 34 in which liquid rubber was blended, degradation of the hardness at normal temperature was significant.

Hereinbefore, several embodiments of the present invention have been described, but these embodiments are merely examples and not intended to limit the scope of the present invention. These embodiments can be implemented in various other forms, and various omissions, substitutions, and modifications can be made within the range not departing from the gist of the present invention. These embodiments, omissions thereof, substitutions, modification, and the like are included in the scope and the gist of the present invention and also included in the invention described in the claims and the equivalent scope thereof.

The invention claimed is:

1. A rubber composition comprising:
   100 parts by mass of a rubber component comprising diene rubber, and
   1 to 100 parts by mass of fine particles which are formed of a (meth)acrylate polymer having a constitutional unit represented by the following general formula (1) and being free from a reactive silyl group and have a glass transition point of −70° C. to 0° C. and an average particle diameter of 10 nm or greater and less than 100 nm,

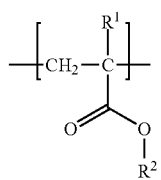
(1)

wherein $R^1$ is a hydrogen atom or a methyl group, $R^1$ present in the same molecule may be the same or different, $R^2$ is an alkyl group having 4 to 18 carbon atoms, and $R^2$ present in the same molecule may be the same or different.

2. The rubber composition according to claim 1, wherein the (meth)acrylate polymer has a constitutional unit represented by the following general formula (2) as the constitutional unit represented by the general formula (1):

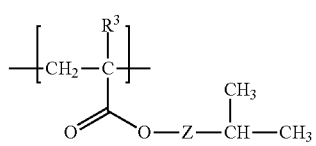
(2)

wherein $R^3$ is a hydrogen atom or a methyl group, $R^3$ present in the same molecule may be the same or different, Z is an alkylene group having 1 to 15 carbon atoms, and Z present in the same molecule may be the same or different.

3. The rubber composition according to claim 1, wherein the (meth)acrylate polymer has a constitutional unit represented by the following general formula (3) as the constitutional unit represented by the general formula (1):

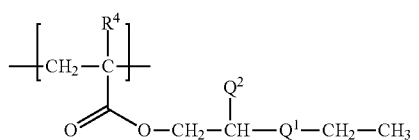
(3)

wherein $R^4$ is a hydrogen atom or a methyl group, $R^4$ present in the same molecule may be the same or different, $Q^1$ is an alkylene group having 1 to 6 carbon atoms, $Q^1$ present in the same molecule may be the same or different, and $Q^2$ is a methyl group or an ethyl group, $Q^2$ present in the same molecule may be the same or different.

4. The rubber composition according to claim 1, wherein the (meth)acrylate polymer is a polymer of a monomer comprising isodecyl methacrylate.

5. The rubber composition according to any one of claim 1, further comprising 20 to 150 parts by mass of silica per 100 parts by mass of the rubber component,
wherein the rubber component comprises styrene-butadiene rubber having at least one functional group selected from the group consisting of an amino group, a hydroxyl group, an epoxy group, a silyl group, and a carboxyl group.

6. The rubber composition according to claim 1, further comprising 20 to 150 parts by mass of silica per 100 parts by mass of the rubber component,
wherein the fine particles are formed of a polymer which has a constitutional unit represented by the general formula (1), contains at least one functional group selected from the group consisting of a nitrile group, an amino group, a carboxyl group, an epoxy group, and a hydroxyl group, and does not contain a reactive silyl group.

7. The rubber composition according to claim 1, wherein the rubber component comprises natural rubber and/or synthetic isoprene rubber, and styrene-butadiene rubber having a glass transition point of −70° C. to −20° C., and
an amount of the fine particles is in a range of 1 to 30 parts by mass per 100 parts by mass of the rubber component.

8. The rubber composition according to claim 7, further comprising 20 to 150 parts by mass of silica and 1 to 70 parts by mass of carbon black, per 100 parts by mass of the rubber component.

9. The rubber composition according to claim 1, wherein the rubber component comprises styrene-butadiene rubber having a glass transition point of −70° C. to −20° C. and butadiene rubber, and
an amount of the fine particles is in a range of 1 to 30 parts by mass per 100 parts by mass of the rubber component.

10. The rubber composition according to claim 9, wherein the rubber component further comprises natural rubber and/or synthetic isoprene rubber.

11. The rubber composition according to claim 9, further comprising 20 to 150 parts by mass of a reinforcing filler which comprises carbon black, per 100 parts by mass of the rubber component.

12. The rubber composition according to claim 1, further comprising 5 to 50 parts by mass of paraffin-based oil per 100 parts by mass of the rubber component,
wherein an amount of the fine particles is in a range of 1 to 30 parts by mass per 100 parts by mass of the rubber component.

13. The rubber composition according to claim 12, wherein 100 parts by mass of the rubber component comprises 30 to 70 parts by mass of natural rubber and 30 to 70 parts by mass of butadiene rubber.

14. The rubber composition according to claim 1, further comprising 50 to 150 parts by mass of carbon black having a specific surface area by nitrogen adsorption of 140 to 250 $m^2/g$ per 100 parts by mass of the rubber component,
wherein an amount of the fine particles is in a range of 1 to 30 parts by mass per 100 parts by mass of the rubber component.

15. The rubber composition according to claim 14, further comprising 20 to 80 parts by mass of a petroleum resin per 100 parts by mass of the rubber component.

16. A pneumatic tire comprising: the rubber composition according claim 1.

\* \* \* \* \*